US008008617B1

(12) United States Patent
Berends, Jr. et al.

(10) Patent No.: US 8,008,617 B1
(45) Date of Patent: Aug. 30, 2011

(54) ION TRANSFER DEVICE

(75) Inventors: John C. Berends, Jr., Bel Air, MD (US); Timothy P. Karpetsky, Towson, MD (US); Ross C. Willoughby, Pittsburgh, PA (US); Edward W. Sheehan, Pittsburgh, PA (US)

(73) Assignee: Science Applications International Corporation, San Diego, CA (US)

( * ) Notice: Subject to any disclaimer, the term of this patent is extended or adjusted under 35 U.S.C. 154(b) by 235 days.

(21) Appl. No.: 12/344,872

(22) Filed: Dec. 29, 2008

Related U.S. Application Data

(60) Provisional application No. 61/009,485, filed on Dec. 28, 2007.

(51) Int. Cl.
*B01D 59/44* (2006.01)

(52) U.S. Cl. ........................ 250/282; 250/288; 250/290

(58) Field of Classification Search .................. 250/282
See application file for complete search history.

(56) References Cited

U.S. PATENT DOCUMENTS

| | | | | |
|---|---|---|---|---|
| 3,708,661 | A | 1/1973 | Hansen et al. | 250/495 ZC |
| 4,000,918 | A | 1/1977 | Reker | 285/93 |
| 4,159,423 | A | 6/1979 | Kambara | 250/423 R |
| 4,209,696 | A | 6/1980 | Fite | 250/281 |
| 4,256,335 | A | 3/1981 | Nielsen, Jr. | 285/250 |
| 4,271,357 | A | 6/1981 | Bradshaw et al. | 250/287 |
| 4,300,004 | A | 11/1981 | Wissner et al. | 570/211 |
| 4,318,028 | A | 3/1982 | Perel et al. | 315/111.81 |
| 4,468,468 | A | 8/1984 | Benninghoven et al. | 436/173 |
| 4,531,056 | A | 7/1985 | Labowsky et al. | 250/288 |
| 4,542,293 | A | 9/1985 | Fenn et al. | 250/288 |
| 4,546,253 | A | 10/1985 | Tsuchiya et al. | 250/288 |
| 4,789,783 | A | 12/1988 | Cook | 250/379 |
| 4,855,595 | A | 8/1989 | Blanchard | 250/287 |
| 4,888,482 | A | 12/1989 | Kato | 250/281 |
| 4,948,962 | A | 8/1990 | Mitsui et al. | 250/288 |
| 4,974,648 | A | 12/1990 | Propst | 144/24.13 |
| 4,976,920 | A | 12/1990 | Jacob | 422/23 |

(Continued)

FOREIGN PATENT DOCUMENTS

GB 2127212 4/1984

(Continued)

OTHER PUBLICATIONS

Application as Filed for U.S. Appl. No. 12/400,831, filed Mar. 10, 2009, 53 pp.

(Continued)

*Primary Examiner* — Phillip A Johnston
(74) *Attorney, Agent, or Firm* — King & Spalding LLP

(57) ABSTRACT

Ions carried in a flowing gas stream are transferred to another gas stream of different composition or purity through an ion selective aperture communicating between the gas streams. The ion selective aperture is formed of a central layer which has an electrically conductive layer on each of its surfaces. One or more open channels extend through the central layer and surface layers allowing physical movement of ions therethrough under the urging and influence of an electric field created by imposing a voltage differential between the conductive surface layers of the ion selective aperture. The gas flow rates of the different gas streams may be independently varied to allow adjustment of ion concentration and flow rate to meet the needs of the ion destination. This device can control sample ion introduction into gas-phase ion detectors, such as ion mobility analyzers, differential mobility analyzers, mass spectrometers, and combinations thereof.

40 Claims, 10 Drawing Sheets

U.S. PATENT DOCUMENTS

| | | | | |
|---|---|---|---|---|
| 4,977,320 | A | 12/1990 | Chowdhury et al. | 250/288 |
| 4,999,492 | A | 3/1991 | Nakagawa | 250/281 |
| 5,141,532 | A | 8/1992 | Sacks et al. | 95/87 |
| 5,142,143 | A | 8/1992 | Fite et al. | 250/288 |
| 5,164,704 | A | 11/1992 | Steen et al. | 340/539.17 |
| 5,168,068 | A | 12/1992 | Yanagisawa et al. | 436/134 |
| 5,171,525 | A | 12/1992 | Jacob | 422/23 |
| 5,192,865 | A | 3/1993 | Zhu | 250/288 |
| 5,280,175 | A | 1/1994 | Karl | 250/287 |
| 5,304,797 | A | 4/1994 | Irie et al. | 250/287 |
| 5,305,015 | A | 4/1994 | Schantz et al. | 347/47 |
| 5,306,910 | A | 4/1994 | Jarrell et al. | 250/286 |
| 5,338,931 | A | 8/1994 | Spangler et al. | 250/287 |
| 5,412,208 | A | 5/1995 | Covey et al. | 250/288 |
| 5,412,209 | A | 5/1995 | Otaka et al. | 250/310 |
| 5,436,446 | A | 7/1995 | Jarrell et al. | 250/288 |
| 5,485,016 | A | 1/1996 | Irie et al. | 250/288 |
| 5,541,519 | A | 7/1996 | Stearns et al. | 324/464 |
| 5,559,326 | A | 9/1996 | Goodley et al. | 250/288 |
| 5,581,081 | A | 12/1996 | Kato et al. | 250/288 |
| 5,587,581 | A | 12/1996 | Stroosnyder | 250/287 |
| 5,625,184 | A | 4/1997 | Vestal et al. | 250/287 |
| 5,684,300 | A | 11/1997 | Taylor et al. | 250/286 |
| 5,736,740 | A | 4/1998 | Franzen | 250/288 |
| 5,747,799 | A | 5/1998 | Franzen | 250/288 |
| 5,750,988 | A | 5/1998 | Apffel et al. | 250/288 |
| 5,753,910 | A | 5/1998 | Gourley et al. | 250/288 |
| 5,756,994 | A | 5/1998 | Bajic | 250/288 |
| 5,798,146 | A | 8/1998 | Murokh et al. | 427/458 |
| 5,828,062 | A | 10/1998 | Jarrell et al. | 250/288 |
| 5,838,002 | A | 11/1998 | Sheehan | 250/288 |
| 5,873,523 | A | 2/1999 | Gomez et al. | 239/3 |
| 5,892,364 | A | 4/1999 | Monagle | 324/464 |
| 5,903,804 | A | 5/1999 | Kirkpatrick et al. | 399/154 |
| 5,945,678 | A | 8/1999 | Yanagisawa | 250/423 F |
| 5,965,884 | A | 10/1999 | Laiko et al. | 250/288 |
| 5,986,259 | A | 11/1999 | Hirabayashi et al. | 250/288 |
| 6,040,575 | A | 3/2000 | Whitehouse et al. | 250/288 |
| 6,060,705 | A | 5/2000 | Whitehouse et al. | 250/288 |
| 6,107,628 | A | 8/2000 | Smith et al. | 250/292 |
| 6,124,675 | A | 9/2000 | Bertrand et al. | 315/111.91 |
| 6,147,345 | A | 11/2000 | Willoughby | 250/288 |
| 6,204,500 | B1 | 3/2001 | Whitehouse et al. | 250/287 |
| 6,207,954 | B1 | 3/2001 | Andrien, Jr. et al. | 250/288 |
| 6,223,584 | B1 | 5/2001 | Mustacich et al. | 73/23.41 |
| 6,225,623 | B1 | 5/2001 | Turner et al. | 250/286 |
| 6,239,428 | B1 | 5/2001 | Kunz | 250/287 |
| 6,278,111 | B1 | 8/2001 | Sheehan et al. | 250/288 |
| 6,309,610 | B1 | 10/2001 | Nejezchleb et al. | 422/186.04 |
| 6,359,275 | B1 | 3/2002 | Bertsch et al. | 250/281 |
| 6,455,846 | B1 | 9/2002 | Prior et al. | 250/288 |
| 6,462,338 | B1 | 10/2002 | Inatsugu et al. | 250/292 |
| 6,465,776 | B1 | 10/2002 | Moini et al. | 250/285 |
| 6,486,469 | B1 | 11/2002 | Fischer et al. | 250/288 |
| 6,495,823 | B1 | 12/2002 | Miller et al. | 250/286 |
| 6,512,224 | B1 | 1/2003 | Miller et al. | 250/286 |
| 6,534,765 | B1 | 3/2003 | Robb et al. | 250/288 |
| 6,537,817 | B1 | 3/2003 | Papen | 436/49 |
| 6,583,407 | B1 | 6/2003 | Fischer et al. | 250/288 |
| 6,583,408 | B2 | 6/2003 | Smith et al. | 250/288 |
| 6,593,570 | B2 * | 7/2003 | Li et al. | 250/290 |
| 6,600,155 | B1 | 7/2003 | Andrien, Jr. et al. | 250/287 |
| 6,610,986 | B2 | 8/2003 | Hartley | 250/423 R |
| 6,649,907 | B2 | 11/2003 | Ebeling et al. | 250/288 |
| 6,683,301 | B2 | 1/2004 | Whitehouse et al. | 250/288 |
| 6,690,004 | B2 | 2/2004 | Miller et al. | 250/286 |
| 6,727,496 | B2 | 4/2004 | Miller et al. | 250/287 |
| 6,744,041 | B2 | 6/2004 | Sheehan et al. | 250/283 |
| 6,750,449 | B2 | 6/2004 | Marcus | 250/288 |
| 6,784,424 | B1 | 8/2004 | Willoughby et al. | 250/292 |
| 6,815,668 | B2 | 11/2004 | Miller et al. | 250/286 |
| 6,818,889 | B1 | 11/2004 | Sheehan et al. | 250/288 |
| 6,822,225 | B2 | 11/2004 | Xu et al. | 250/287 |
| 6,852,969 | B2 | 2/2005 | Marcus et al. | 250/288 |
| 6,852,970 | B2 | 2/2005 | Yamada et al. | 250/288 |
| 6,867,415 | B2 | 3/2005 | Hughey et al. | 250/288 |
| 6,878,930 | B1 | 4/2005 | Willoughby et al. | 250/281 |
| 6,888,132 | B1 | 5/2005 | Sheehan et al. | 250/288 |
| 6,914,243 | B2 * | 7/2005 | Sheehan et al. | 250/288 |
| 6,943,347 | B1 | 9/2005 | Willoughby et al. | 250/288 |
| 6,949,740 | B1 | 9/2005 | Sheehan et al. | 250/288 |
| 6,949,741 | B2 | 9/2005 | Cody et al. | 250/288 |
| 6,972,407 | B2 | 12/2005 | Miller et al. | 250/287 |
| 6,998,605 | B1 | 2/2006 | Frazer et al. | 250/281 |
| 7,005,634 | B2 | 2/2006 | Shiokawa et al. | 250/288 |
| 7,041,966 | B2 | 5/2006 | Frazer et al. | 250/281 |
| 7,053,367 | B2 | 5/2006 | Tobita et al. | 250/288 |
| 7,057,168 | B2 * | 6/2006 | Miller et al. | 250/287 |
| 7,060,976 | B2 | 6/2006 | Sheehan et al. | 250/288 |
| 7,064,320 | B2 | 6/2006 | Yamada et al. | 250/288 |
| 7,078,068 | B2 | 7/2006 | Book | 426/140 |
| 7,083,112 | B2 | 8/2006 | Ivri | 239/4 |
| 7,087,898 | B2 | 8/2006 | Willoughby et al. | 250/288 |
| 7,091,493 | B2 | 8/2006 | Hiraoka | 250/425 |
| 7,095,019 | B1 | 8/2006 | Sheehan et al. | 250/288 |
| 7,112,785 | B2 | 9/2006 | Laramee et al. | 250/288 |
| 7,112,786 | B2 | 9/2006 | Russ, IV et al. | 250/288 |
| 7,138,626 | B1 | 11/2006 | Karpetsky | 250/288 |
| 7,253,406 | B1 | 8/2007 | Sheehan et al. | 250/288 |
| 7,259,368 | B2 | 8/2007 | Frazer et al. | 250/281 |
| 7,274,015 | B2 | 9/2007 | Miller et al. | 356/508 |
| 7,429,731 | B1 | 9/2008 | Karpetsky | 250/288 |
| 7,576,322 | B2 | 8/2009 | Karpetsky et al. | 250/288 |
| 7,586,092 | B1 | 9/2009 | Karpetsky | 250/288 |
| 2002/0011560 | A1 | 1/2002 | Sheehan et al. | 250/283 |
| 2002/0175278 | A1 | 11/2002 | Whitehouse | 250/281 |
| 2002/0185593 | A1 | 12/2002 | Doring | 250/287 |
| 2002/0185595 | A1 | 12/2002 | Smith et al. | 250/288 |
| 2003/0034452 | A1 | 2/2003 | Fischer et al. | 250/288 |
| 2003/0038236 | A1 | 2/2003 | Russ, IV et al. | 250/288 |
| 2003/0197121 | A1 | 10/2003 | Turecek et al. | 250/281 |
| 2004/0161856 | A1 | 8/2004 | Handly | 436/177 |
| 2004/0245458 | A1 | 12/2004 | Sheehan et al. | 250/288 |
| 2005/0056775 | A1 | 3/2005 | Cody et al. | 250/281 |
| 2005/0196871 | A1 | 9/2005 | Cody et al. | 436/173 |
| 2006/0249671 | A1 | 11/2006 | Karpetsky | 250/288 |
| 2007/0084999 | A1 | 4/2007 | Miller et al. | 250/288 |
| 2007/0114389 | A1 | 5/2007 | Karpetsky et al. | 250/288 |
| 2008/0296493 | A1 | 12/2008 | Willoughby et al. | 250/288 |
| 2009/0294660 | A1 | 12/2009 | Whitehouse et al. | 250/288 |
| 2010/0059689 | A1 | 3/2010 | Horiike et al. | 250/425 |

FOREIGN PATENT DOCUMENTS

| | | |
|---|---|---|
| GB | 2288061 | 10/1995 |
| JP | 04215329 | 8/1992 |
| JP | 05203637 | 8/1993 |
| JP | 10088798 | 4/1998 |
| WO | WO 93/14515 | 7/1993 |
| WO | WO 98/07505 | 2/1998 |
| WO | WO 99/63576 | 12/1999 |
| WO | WO 00/08455 | 2/2000 |
| WO | WO 00/08456 | 2/2000 |
| WO | WO 00/08457 | 2/2000 |
| WO | WO 01/33605 A2 | 5/2001 |
| WO | WO 01/33605 A3 | 5/2001 |
| WO | WO 03/010794 | 2/2003 |
| WO | WO 2004/098743 | 11/2004 |
| WO | WO 2004/110583 | 12/2004 |
| WO | WO 2006/011171 | 2/2006 |
| WO | WO 2006/122121 | 11/2006 |
| WO | WO 2008/054393 | 5/2008 |

OTHER PUBLICATIONS

Becker, K. H., et al., "Non-Equilibrium Air Plasmas at Atmospheric Pressure," Institute of Physics Publishing, Philadelphia, Pennsylvania, 42 pp., 2005 (Cover, Copyright Page, Table of Contents, and pp. 276-277, 286-293, and 328-350).

Application as Filed for U.S. Appl. No. 11/987,632, filed Dec. 3, 2007, 46 pp.

Application as Filed for U.S. Appl. No. 11/455,334, filed Jun. 19, 2006, 10 pp.

Application as Filed for U.S. Appl. No. 11/544,252, filed Oct. 7, 2006, 49 pp.

Application as Filed for U.S. Appl. No. 11/594,401, filed Nov. 8, 2006, 23 pp.

Application as Filed for U.S. Appl. No. 12/153,358, filed May 16, 2008, 46 pp.
Application as Filed for U.S. Appl. No. 12/200,941, filed Aug. 29, 2008, 21 pp.
Hanson, Eric, "How an Ink Jet Printer Works" [online], [retrieved on May 15, 2008], 5 pp., Retrieved from the Internet: http://www.imaging.org/resources/web_tutorials/inkjet_files/inkjet.cfm.
Le, Hue P., "Progress and Trends in Ink-Jet Printing Technology" [online], *Journal of Imaging Science and Technology*, vol. 42, No. 1, Jan./Feb. 1998 [retrieved on May 15, 2008], 28 pp, Retrieved from the Internet: http://www.imaging.org/resources/web_tutorials/inkjet.cfm.
Chemi-Ionization—Mass Spectrometry Terms, "Chemi-Ionization" [online], Dec. 26, 2005 [retrieved on Apr. 28, 2006], 1 p., Retrieved from the Internet: http://www.msterms.com/wiki/index.php?title=Chemi-Ionization.
Scott, R.P.W., "Gas Chromatography Detectors" [online], Part of the Chrom. Ed. Series, Subsection: Thermal Argon Detector, Copyright 2002-2005 [retrieved on Apr. 28, 2006], 7 pp., Retrieved from the Internet: http://www.chromatography-online.org/GC-Detectors/Ionization-Detectors/Thermal-Argon/rs61.html.
Scott, R.P.W., "Gas Chromatography Detectors" [online], Part of the Chrom. Ed. Series, Subsection: Macro Argon Detector, Copyright 2002-2005 [retrieved on Apr. 28, 2006], 10 pp., Retrieved from the Internet: http://www.chromatography-online.org/GC-Detectors/Ionization-Detectors/Macro-Argon/rs54.html.
Scott, R.P.W., "Gas Chromatography Detectors" [online], Part of the Chrom. Ed. Series, Subsection: Micro Argon Detector, Copyright 2002-2005 [retrieved on May 11, 2006], 6 pp., Retrieved from the Internet: http://www.chromatography-online.org/GC-Detectors/Ionization-Detectors/Micro-Argon/rs59.html.
Scott, R.P.W., "Gas Chromatography Detectors" [online], Part of the Chrom. Ed. Series, Subsection: The Helium Detector, Copyright 2002-2005 [retrieved on Apr. 28, 2006], 8 pp., Retrieved from the Internet: http://www.chromatography-online.org/GC-Detectors/Ionization-Detectors/Helium/rs64.html.
Laroussi, M., and Lu, X., "Room-Temperature Atmospheric Pressure Plasma Plume for Biomedical Applications," *Applied Physics Letters* 87, 113902, Sep. 8, 2005.
Akishev, Yu, et al., "Negative Corona, Glow and Spark Discharges in Ambient Air and Transitions Between Them," *Plasma Sources Sci. Technol.*, vol. 14, pp. S18-S25 (2005).
Willoughby, Ross C., et al., "Transmission of Ions Through Conductance Pathways from Atmospheric Pressure," *Proceedings of the 52nd ASMS Conference on Mass Spectrometry and Allied Topics*, Nashville, Tennessee, 2 pp., May 23-27, 2004.
Sheehan, Edward W., et al., "Atmospheric Pressure Focusing," *Proceedings of the 52nd ASMS Conference on Mass Spectrometry and Allied Topics*, Nashville, Tennessee, 2 pp., May 23-27, 2004.
Benocci, R., et al., "I-V Characteristics and Photocurrents of a He Corona Discharge Under Flow Conditions," *J. Phys. D: Appl. Phys.*, vol. 37, pp. 709-714 (2004).
Bokman, C. Fredrik, "Analytical Aspects of Atmospheric Pressure Ionization in Mass Spectrometry," Acta Universitatis Upsaliensis, *Comprehensive Summaries of Uppsala Dissertations from the Faculty of Science and Technology*, vol. 748, 46 pp., 2002.
Willoughby, R., Sheehan, E., Mitrovich, A., "A Global View of LC/MS," Global View Publishing, pp. 64-65, 470-471, Copyright 2002.
Stach, J., et al., "Ion Mobility Spectrometry—Basic Elements and Applications," *International Journal for Ion Mobility Spectrometry*, IJIMS 5(2002)1, pp. 1-21, 2002.
Hanley, Luke, et al., "Surface Mass Spectrometry of Molecular Species," *Journal of Mass Spectrometry*, vol. 34, pp. 705-723 (1999).
Steinfeld, Jeffrey I., et al., "Explosives Detection: A Challenge for Physical Chemistry," *Annual Review of Physical Chemistry*, vol. 49, pp. 203-232, Oct. 1998.
Lin, B., Sunner, J., "Ion Transport by Viscous Gas Flow Through Capillaries," *J. Am. Soc. Mass Spectrom. 5*, pp. 873-885 (1994).
Potjewyd, J., "Focusing of Ions in Atmospheric Pressure Gases Using Electrostatic Fields," Ph.D. Thesis, University of Toronto (1983).
Mahoney, J. F., et al., "A Theoretical and Experimental Basis for Producing Very High Mass Biomolecular Ions by Electrohydrodynamic Emission," *22nd IEEE Industry Applications Society Annual Meeting*, Atlanta, Georgia, Oct. 18-23, 1987.
Olivares, J. A., et al., "On-Line Mass Spectrometric Detection for Capillary Zone Electrophoresis," *Anal. Chem. 59*, pp. 1230-1232 (1987).
Lee, T. D., et al., "An EHD Source for the Mass Spectral Analysis of Peptides," *Proceedings of the 36th ASMS Conference on Mass Spectrometry and Allied Topics*, San Francisco, California, Jun. 5-10, 1988.
Smith, R. D., et al., "Capillary Zone Electrophoresis-Mass Spectrometry Using an Electrospray Ionization Interface," *Anal. Chem. 60*, pp. 436-441 (1988).
Lee, T. D., et al. "Electrohydrodynamic Emission Mass Spectra of Peptides," *Proceedings of the 37th ASMS Conference on Mass Spectrometry and Allied Topics*, Miami Beach, Florida, May 21-26, 1989.
Mahoney, J. F., et al., "Electrohydrodynamic Ion Source Design for Mass Spectrometry: Ionization, Ion Optics and Desolvation," *Proceedings of the 38th ASMS Conference on Mass Spectrometry and Allied Topics*, Tucson, Arizona, Jun. 3-8, 1990.
Feng, X., et al., "Single Isolated Droplets with Net Charge as a Source of Ions," *J. Am. Soc. Mass Spectrom*, 11, pp. 393-399 (2000).
Schneider, B. B., et al., "An Atmospheric Pressure Ion Lens to Improve Electrospray Ionization at Low Solution Flow-Rates," *Rapid Commun. Mass Spectrom* 15, pp. 2168-2175 (2001).
Alousi, A., et al., "Improved Transport of Atmospheric Pressure Ions Into a Mass Spectrometer," *The Proceedings of the 50th ASMS Conference on Mass Spectrometry and Allied Topics*, Orlando Florida, Jun. 2-6, 2002.
Klesper, H., et al., "Intensity Increase in ESI MS by Means of Focusing the Spray Cloud onto the MS Orifice," *The Proceeding of the 50th ASMS Conference on Mass Spectrometry and Allied Topics*, Orlando, Florida, Jun. 2-6, 2002.
Schneider, B. B., et al., "An Atmospheric Pressure Ion Lens that Improves Nebulizer Assisted Electrospray Ion Sources," *J. Am. Soc. Mass Spectrom. 13*, pp. 906-913 (2002).
Hartley, F. T., et al., "NBC Detection in Air and Water," *Micro/Nano 8*, pp. 1, 2, and 8 (Dec. 2003).
Cody, R. B., et al., "Versatile New Ion Source for the Analysis of Materials in Open Air Under Ambient Conditions," *Anal. Chem. 77*, pp. 2297-2302 (2005).
McEwen, C. N., et al., "Analysis of Solids, Liquids, and Biological Tissues Using Solids Probe Introduction at Atmospheric Pressure . . . ," *Anal. Chem. 77*, pp. 7826-7831 (2005).
Niessen, W.M.A. and van der Greef, J., "Liquid Chromatography—Mass Spectrometry Principles and Applications," Marcel Dekker, Inc., New York, New York, pp. 339-341, Copyright 1992.
Hart, K. J., et al., "Reaction of Analyte Ions With Neutral Chemical Ionization Gas," *Journal of the American Society for Mass Spectrometry*, vol. 3, No. 5, pp. 549-557, 1992 (ISSN 1044-0305).
Bruins, A.P., "Mass Spectrometry With Ion Sources Operating at Atmospheric Pressure," *Mass Spectrometry Reviews*, vol. 10, pp. 53-77, 1991.
Duckworth, D. C., et al., "Radio Frequency Powered Glow Discharge Atomization/Ionization Source for Solids Mass Spectrometry," *Analytical Chemistry*, vol. 61, No. 17, pp. 1879-1886, Sep. 1, 1989.
Beres, S.A., et al., "A New Type of Argon Ionisation Detector," *Analyst*, vol. 112, pp. 91-95, Jan., 1987.
Lovelock, J.E. And Lipsky, S.R., "Electron Affinity Spectroscopy—A New Method for the Identification of Functional Groups in Chemical Compounds Separated by Gas Chromatography," *J. Amer. Chem. Soc.*, vol. 82, pp. 431-433, Jan. 20, 1960.
Lovelock, J.E., "A Sensitive Detector for Gas Chromatrography," *Journal of Chromatography*, vol. 1, pp. 35-46, 1958.
Lovelock, J.E., "Measurement of Low Vapour Concentrations by Collision with Excited Rare Gas Atoms," *Nature*, vol. 181, pp. 1460-1462, 1958.
"Principles of DC and RF Plasma Spraying" [online], 1 p., Retrieved from the Internet: http://wiv.vdi-bezirksverein.de/HenneVDI.pdf, 1999.
Leparoux, et al., "Investigation of Non-Oxide Nanoparticles by RF Induction Plasma Processing—Synthesis, Modelling and In-Situ Monitoring," *EMPA-Thun, Materials Technology*, 1 p., 2003.

Guimbaud, C., et al., "An APCI Ion Source to Monitor $HNO_3$ Under Ambient Air Conditions" [online], 1 p., Retrieved from the Internet: http://lch.web.psi.ch/pdf/anrepo3/19.pdf, 2003.
Cody, et al., "DART™: Direct Analysis in Real Time for Drugs, Explosives, Chemical Agents, and More . . . ," Sanibel Conference (American Society for Mass Spectrometry Sanibel Conference on Mass Spectrometry in Forensic Science and Counter-Terrorism), Clearwater, Florida, 39 pp., Jan. 28-Feb. 1, 2004.

* cited by examiner

ION TRANSFER DEVICE

CROSS-REFERENCE TO RELATED APPLICATIONS

This application claims priority to U.S. Provisional Patent Application Ser. No. 61/009,485, filed Dec. 28, 2007, entitled ION TRANSFER DEVICE, which is hereby incorporated by reference in its entirety.

BACKGROUND

1. Technical Field

This invention relates generally to methods and systems for transferring ions from one gas stream or other environment to another. More specifically, this invention comprises an ion transfer device arranged to urge ions contained in a first gas stream through an ion selective aperture into a second gas stream of different composition or characteristics.

2. Description of Related Art

Ions are routinely produced by subjecting a gas stream to an energetic source. Commonly used energetic sources include radioactive isotopes, plasmas, ultraviolet light, and many others. Such sources can produce ions in an environment (e.g., ambient air), that is not compatible with an ion destination (e.g., a detector, an ion trap, a reaction region, or a deposition or neutralization site). A solution to this problem is to transfer ions from one environment (e.g., a gas stream) to another, without transferring neutral components such as water or particles, which inhibit detection or interfere with performance at the ion destination.

Transferring ions from one gas stream to another may be necessitated by a variety of objectives, such as, but not limited to, the need to remove ions from a gas stream; to move ions that were created or collected in one gas stream to another gas stream that better meets the requirements of detection or identification equipment; to move ions to a gas stream to undergo chemical and/or physical reactions to enable differentiation among ions or to produce a specific product; to move ions from a gas of erratic or changing composition, such as ambient air, to a gas stream having a fixed and stable composition; and various combinations of the above. Ion transfer may be accomplished using a variety of known techniques including the use of ion selective apertures such as those described in U.S. Pat. Nos. 6,914,243, 6,949,740, and 7,060,976, and in pending U.S. Patent Application Publication No. 2008/0296493, all of which are incorporated herein by reference in their entirety. Ion focusing at atmospheric pressure is described in U.S. Pat. Nos. 6,818,889, 6,878,930, 6,949,740, and 7,087,898, which are incorporated by reference in their entirety.

SUMMARY

The methods and systems described herein attempt to improve upon the known and presently used devices and techniques for effecting ion transfer. Ions can be transferred from a gas stream flowing through a first conduit or tube into a second conduit or tube containing a flowing gas stream of different composition through an ion selective aperture under the influence of a potential gradient applied to electrically conductive surfaces of the aperture. The first and second tubes can be sited adjacent one another, and the ion selective aperture can form a common wall between the tubes. Gas flow rates in the first and second tubes can be independent of one another allowing a different concentration of ions in the second tube relative to the first tube. As a result, the gas composition, flow rate, and ion concentration in the second tube can be compatible with the needs of the ion destination region, such as a sensor or detector.

In one embodiment, an ion transfer device comprises a first conduit having a first gas stream, a second conduit having a second gas stream to receive the ions from the first gas stream, and an aperture layer disposed between the first conduit and the second conduit. The aperture layer has a first conductive layer proximate to the first conduit, a second conductive layer proximate to the second conduit, and an insulating layer between the first and second conductive layers. The aperture layer has one or more channels extending from the first conduit to the second conduit and through the first and second conductive layers.

In another embodiment, an ion transfer device comprises a first conduit having a first gas stream, a second conduit having a second gas stream to receive the ions from the first gas stream, a first aperture layer disposed between the first conduit and the second conduit. The first aperture layer has a first conductive layer proximate to the first conduit, a second conductive layer proximate to the second conduit, and an insulating layer between the first and second conductive layers. The insulating layer has one or more channels extending from the first conduit to the second conduit and through the first and second conductive layers. The ion transfer device also has a third conduit comprising a third gas stream to receive the ions from the second gas stream, and a second aperture layer disposed between the second conduit and the third conduit. The second aperture layer has a third conductive layer proximate to the second conduit, a fourth conductive layer proximate the third conduit, and a second insulating layer between the third and fourth conductive layers. The second insulating layer has one or more channels extending from the second conduit to the third conduit and through the third and fourth conductive layers.

In yet another embodiment, an ion transfer device comprises a first conduit comprising a first gas stream, the first conduit divided into first and second segments separated by an insulator, a second conduit comprising a second gas stream to receive the ions from the first segment; a third conduit comprising a third gas stream to receive ions from the second segment, and a first aperture layer disposed between the first segment and the second conduit. The first aperture layer has a first conductive layer proximate to the first segment, a second conductive layer proximate to the second conduit, and a first insulating layer between the first and second conductive layers. The first insulating layer has one or more channels extending from the first segment to the second conduit and through the first and second conductive layers, and a second aperture layer disposed between the second segment and the third conduit. The second aperture layer has a third conductive layer proximate to the second segment, a fourth conductive layer proximate to the third conduit, and a second insulating layer between the third and fourth conductive layers. The second insulating layer has one or more channels extending from the second segment to the third conduit and through the third and fourth conductive layers.

In another embodiment, a method for transferring ions comprises directing one or more ions from a first conduit to a second conduit through one or more channels extending through a plate between the first conduit to the second conduit; applying a voltage to a first conductive layer proximate to the first conduit and the plate; and applying a second voltage to a second conductive layer proximate to the second conduit and the plate; wherein the first voltage is different than the second voltage.

In another embodiment, a method for transferring ions comprises directing a plurality of ions from a first conduit to a second conduit through one or more channels extending through a first plate between the first conduit to the second conduit; applying a voltage to a first conductive layer proximate to the first conduit and the first plate; applying a second voltage to a second conductive layer proximate to the second conduit and the first plate, wherein the first voltage is different than the second voltage; directing the plurality of ions from the second conduit to a third conduit through one or more channels extending through a second plate between the second conduit and the third conduit; applying a third voltage to a third conductive layer proximate to the second conduit and the second plate; and applying a fourth voltage to a fourth conductive layer proximate to the second plate and the third conduit, wherein the third voltage is different than the fourth voltage.

In yet another embodiment, a method for transferring ions comprises insulating a first segment of a first conduit from a second segment of the first conduit; directing a first plurality of ions from the first segment to a second conduit through one or more channels extending through a first plate from the first segment to the second conduit; applying a voltage to a first conductive layer proximate to the first segment and the first plate; applying a second voltage to a second conductive layer proximate to the second conduit and the first plate, wherein the first voltage is different than the second voltage; directing a second plurality of ions from the second segment to a third conduit through one or more channels extending through a second plate between the second segment and the third conduit; applying a third voltage to a third conductive layer proximate to the second segment and the second plate; and applying a fourth voltage to a fourth conductive layer proximate to the second plate and the third conduit, wherein the third voltage is different than the fourth voltage.

In another embodiment, an ion transfer device comprises a first conduit comprising a first gas stream; a second conduit comprising a second gas stream to receive one or more positive ions from the first gas stream; and a first aperture layer disposed between the first conduit and the second conduit. The aperture layer comprises a first conductive layer proximate to the first conduit; a second conductive layer proximate to the second conduit; and a first insulating layer between the first and second conductive layers comprising one or more channels extending from the first conduit to the second conduit and through the first and second conductive layers. A third conduit comprises a third gas stream to receive one or more negative ions from the first conduit. A second aperture layer is disposed between the first conduit and the third conduit. The aperture layer comprises a third conductive layer proximate to the first conduit; a fourth conductive layer proximate to the third conduit; and a second insulating layer between the third and fourth conductive layers comprising one or more channels extending from the first conduit to the third conduit and through the third and fourth conductive layers. A mixing union combines the second gas stream and the third gas stream.

In yet another embodiment, an ion transfer device comprises a first conduit comprising a first gas stream and configured to receive one or more positive ions from a second conduit comprising a second gas stream and to receive one or more negative ions from a third conduit comprising a third gas stream. A first aperture layer is disposed between the first conduit and the second conduit. The aperture layer comprises a first conductive layer proximate to the first conduit; a second conductive layer proximate to the second conduit; and a first insulating layer between the first and second conductive layers comprising one or more channels extending from the first conduit to the second conduit and through the first and second conductive layers. A second aperture layer is disposed between the first conduit and the third conduit. The aperture layer comprises a third conductive layer proximate to the first conduit; a fourth conductive layer proximate to the third conduit; and a second insulating layer between the third and fourth conductive layers comprising one or more channels extending from the first conduit to the third conduit and through the third and fourth conductive layers.

DETAILED DESCRIPTION

Reference will now be made in detail to the preferred embodiments of the present invention, examples of which are illustrated in the accompanying drawings.

The embodiments described herein may be used in conjunction with the technology described in one or more of the following applications: U.S. Pat. No. 7,138,626, filed May 5, 2005, entitled METHOD AND SYSTEM FOR NON-CONTACT SAMPLING AND DETECTION; U.S. patent application Ser. No. 11/580,876, filed Oct. 16, 2006, entitled METHOD AND SYSTEM FOR NON-CONTACT SAMPLING AND DETECTION; U.S. patent Ser. No. 11/987,632, filed Dec. 3, 2007, entitled METHOD AND SYSTEM FOR NON-CONTACT SAMPLING AND DETECTION; U.S. patent application Ser. No. 11/455,334, filed Jun. 19, 2006, entitled SAMPLE TUBE HOLDER, U.S. patent application Ser. No. 11/544,252, filed Oct. 7, 2006, entitled REMOTE REAGENT ION GENERATOR; U.S. patent application Ser. No. 11/594,401, filed Nov. 8, 2006, entitled NON-CONTACT DETECTOR SYSTEM WITH PLASMA ION SOURCE; U.S. patent application Ser. No. 12/153,358, filed May 16, 2008, entitled METHOD AND MEANS FOR PRECISION MIXING; PCT/US2006/042863, filed Nov. 2, 2006, entitled METHOD AND DEVICE FOR NON-CONTACT SAMPLING AND DETECTION; and U.S. patent application Ser. No. 12/200,941, filed Aug. 29, 2008, entitled MINIATURE IONIZATION SOURCE; all of which are hereby incorporated by reference in their entirety.

The methods and systems described herein can transfer ions, either positive or negative or both, from one gas stream to another using electric or magnetic fields to urge ions entrained in one gas stream to move to a different gas stream.

Figure 1A:
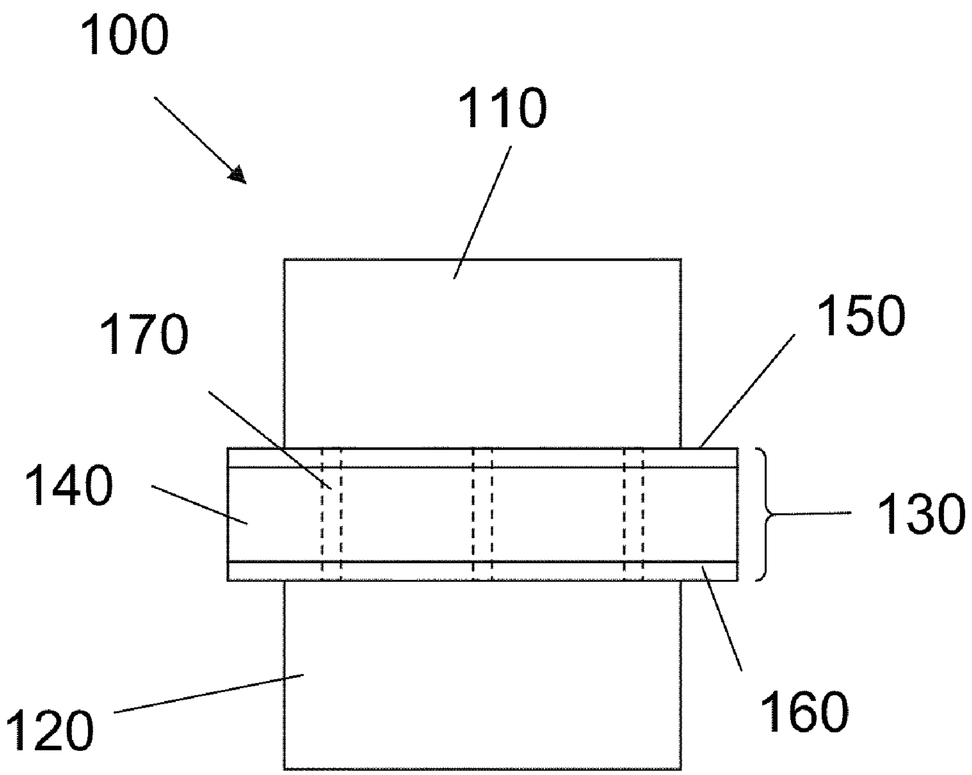
FIG. 1A shows a device for transferring ions from one gas stream to another gas stream according to an exemplary embodiment.

Referring to FIG. 1A, an ion transfer device 100 has a first tube or conduit 110 and a second tube or conduit 120 separated by an ion selective aperture layer 130. Ion selective refers to a specificity to transfer ions instead of non-ions, such as a transfer of ions created in air without transferring the neutral or uncharged molecules in air such as water, oxygen, and nitrogen. The selectivity applies to all ions of one charge—either positively or negatively charged ions. Within the categories of positively charged ions and negatively charged ions, there can be multiple ions. For example, in a gas stream having $H_3O^+$ and $O_2^+$, among many other neutral or negatively charged species, an ion transfer device can be configured to transfer only these positively charged ions, leaving all other species behind.

It is intended that although the term tube is used in the exemplary embodiments, the shape of the tube or conduit is not limited to a cylinder and may encompass any shape, size, or path. The aperture layer 130 has an insulating layer 140, which is fabricated of a non-conductive or dielectric material, such as glass, doped glass, a thermally-resistant plastic material such as VESPEL, liquid crystal polymer, fiberglass, or plastic. An electrically conductive layer or film 150 forms a first surface (e.g., an upper surface) of aperture layer 130 and a similar electrically conducting layer or film 160 forms a second surface (e.g. a lower surface) of aperture layer 130. Examples of conductive materials are gold, copper, stainless steel, silver, and platinum, among others. The preferred materials can be selected by a variety of criteria, including reactivity, ease of fabrication, cost, and commercial availability. At least one aperture or channel 170 extends through the insulating layer 140 and through the conductive layers 150, 160 to provide communication between the interior of first tube 110 and the interior of second tube 120. In a preferred embodiment, aperture layer 130 has one or more channels 170. Channels 170 may be circular, square, rectangular, or other geometric shape in cross-section and can be arranged randomly, in patterns, or in single or multiple rows. The thickness of the aperture layer 130 and the size and shape of channels 170 are not critical and may vary, but optimally are sized using the principles of fluid mechanics to minimize turbulence and mixing of gas streams at or in the channels.

Figure 1B:
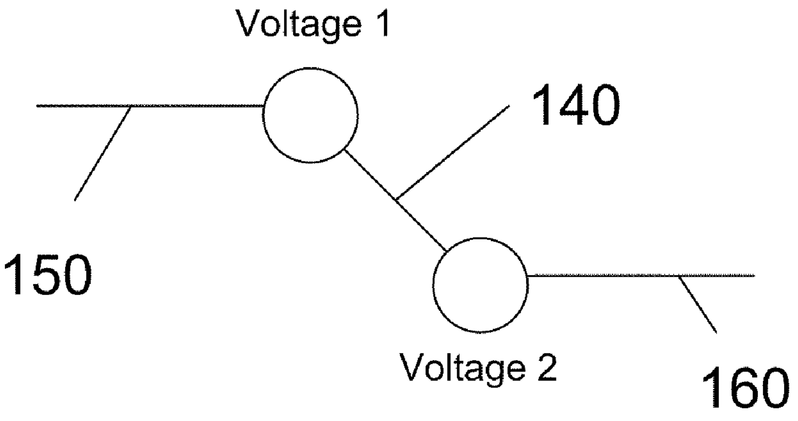
FIG. 1B shows a diagram of the voltage profile across the ion transfer device of FIG. 1A according to an exemplary embodiment.

Tubes 110, 120 can be positioned substantially adjacent one another having the aperture layer 130 disposed therebetween and forming a common wall between the tubes 110, 120. An electric field can be created by applying a first voltage to conductive layer 150 and a second voltage applied to conductive layer 160 that is closer to ground than the voltage applied to conductive layer 150. A voltage differential is thereby created between the two conductive layers 150, 160, as shown in FIG. 1B. The voltages applied to the conductive layers 150, 160 are of such magnitude and difference to create an attractive electric field in the regions from the first tube 110, through the aperture openings of the aperture layer 130, to the second tube 120. These attractive electric fields result in the migration of ions of selected polarity from the flow of the first tube, through the aperture layer openings, to the flow of the second tube.

In operation, a first gas stream can flow through tube 110 and a second gas stream of different composition can flow through tube 120. Gas flow direction in tube 110 can be parallel or orthogonal to the surface of conductive layer 150. If the flow is orthogonal, the flow may be in a direction towards the conductive layer 150 and the flow of gas in tube 120 can be parallel to conductive layer 160. Also, if the gas flow direction in tube 110 is parallel to the conductive layer 150, and the flow is from left to right, then the flow direction in tube 120 can be right to left (concurrent flow) or left to right (counter flow). The movement of ions in the first gas stream flowing through tube 110 is primarily controlled by fluid mechanical principles applied to the geometry of the tube. However, those ions can be pushed or pulled through the aperture means from the gas flowing in tube 110 into the second gas stream flowing in tube 120 by superimposing an electric field onto the mechanical control of ion movement in tube 110 as the ions near the aperture layer 130 region. A combination of aerodynamic, mechanical, magnetic, and/or electrical forces can direct the ions in one direction and unwanted neutral molecules in the other direction. As ions approach the aperture layer 130, the electric field forces become dominant, which results in ion flow through channels 170 into the second gas stream flowing in tube 120. Aerodynamic forces can then become dominant, carrying ions away from the electric field.

A number of different parameters can influence or control the amount of ions transferred. Exemplary parameters include the flow rates of gases in the first tube 110 and the second tube 120; the direction of gas flow in one tube relative to the gas flow in the other tube, i.e., either concurrent or counter flow; the applied voltage differential between the two tubes 110, 120; and the cross-sectional and linear geometry of one tube relative to the other tube. For example, one or both tubes can be curved to eliminate sharp changes in ion movement direction. An arrangement where both tubes are curved away from each other, with the common point being the aperture layer 130 tangential to both tubes, can be advantageous in that the gas streams in each tube can have a tendency to stay attached to a convex surface rather than to follow a straight line. This boundary layer attachment, or Coanda effect, can reduce the possibility of significant mixing of the two gas streams in the aperture layer 130. Also, the tubes can be arranged concentrically with aperture layer 130 forming at least a portion of the inner tube wall thus permitting ion passage from the gas flowing in the inner tube into gas flowing in an annular region between the two tubes. When the first and second tubes are straight, maintenance of laminar gas flow across the aperture layer 130 also serves to minimize mixing, or cross contamination, of the gas streams on either side of the aperture layer 130.

The total gas flow rate and the gas velocities in the two tubes 110, 120 may be mandated by the requirements of other modules used in the system such as, for example, detectors or analyzers, or to avoid any significant spillover and mixing of the respective gas streams flowing through the tubes 110, 120. Gas velocity in each of the tubes 110, 120 may be set at any desired rate by changing the cross-sectional area of the tubes 110, 120, or by changing the gas flow rate in either or both of the tubes within the overall system constraints. It can also be useful to cause a small amount of spillover from one gas stream to the other. For example, the integrity of the stream receiving transferred ions can be improved, or better maintained, if a small portion of that stream is caused to flow through the channels 170 into the ion source stream by maintaining a slightly higher gas pressure in the ion receiving stream as compared to the gas pressure in the ion source stream.

The ion concentration can be varied. The ion concentration at a particular point after transfer from the first tube to the second tube can be significantly changed from the ion concentration at a point in the first tube prior to the ion transfer. The variation can be caused by appropriate manipulation of the gas flow rates in either or both of the tubes. Hence, it is possible to obtain ion concentrations in the second tube that are the same as, or lesser than, or greater than, the original ion concentration in the first tube before ion transfer. For example, in a specific time period, ions can be transferred from a high volume, fast moving gas stream in the first tube to a low volume, slow moving gas stream in the second tube. Although the total number of ions remains essentially unchanged, the resulting ion concentration in the second tube gas stream can be far higher than was the ion concentration in the first tube. If the gas stream containing the transferred ions is then passed to a sensor that measures ion concentration, the resulting sensor output signal is similarly affected as is the signal to noise ratio. Raising ion concentration in the receiving gas stream can also provide an apparent increase in the sensor sensitivity, permitting the detection of lower ion concentrations.

Sensitivity and resolution of a sensor or detector system used with the exemplary methods and systems described herein can be improved by adding dopants or other chemicals to the gas stream of the transferred ions, thereby reducing interferences. For example, dopants or chemicals include chlorides, dilute acetone, dilute ammonia, weak acids or bases, or chemicals that would neutralize interferents, while not interfering with the detection of ions of interest. Chemicals added to the gas stream containing transferred ions may also be selected to neutralize ions or to add structural elements that could enhance or amplify detection of the modified molecule. For example, acetone can be added to the conditioned stream to improve both selectivity and sensitive for some analytes. Some detectors detect neutral molecules rather than ions. Using an ion transfer device, one can separate the ions and subsequently neutralize the ions and detect them using optical spectroscopy, for example. Further, the addition of structural elements to an ion or neutral molecule, such as fluorescent tags, can significantly increase the limits of sensitivity of detection.

A number of advantages can be obtained through use of the described ion transfer methods and systems. First, the rate of flow of gas through the first tube is independent of the rate of gas flow through the second tube, and those flow rates may be independently varied as well as the composition of the gas in the different tubes. For example, the gas carried in one tube may be ambient air and the gas carried in the second tube may be a fixed composition air or other gas or gas mixture. Ion transmission from one tube to another tube can be readily accomplished by applying a bias voltage to the first and second insulating layers and, by varying the voltage, some or most of the ions carried in one gas stream may be transferred to the other gas stream. Ions may be selectively separated from other unwanted uncharged components, such as particulate matter, water, and other unwanted species. The ion concentration may be increased or decreased by maintaining different gas flow rates in one of the tubes as compared to the other. Biological species, such as proteins and toxins, can be subjected to a charging mechanism such as electrospray and thereafter can be separated from unwanted neutral molecules. The tube design can be further used to add desirable components such as taggants, quantitative standards, reactants, and the like by entraining those desirable components in the gas stream to which the ions are transferred. Also, the described ion transfer methods and systems provide an effective method for conditioning analyte ions between ion source regions and destination regions. Typical destination regions include detector systems such as mass spectrometers, ion mobility spectrometers and differential mobility spectrometers, and systems such as those for deposition, printing, or sample preparation, among others.

Figure 2:
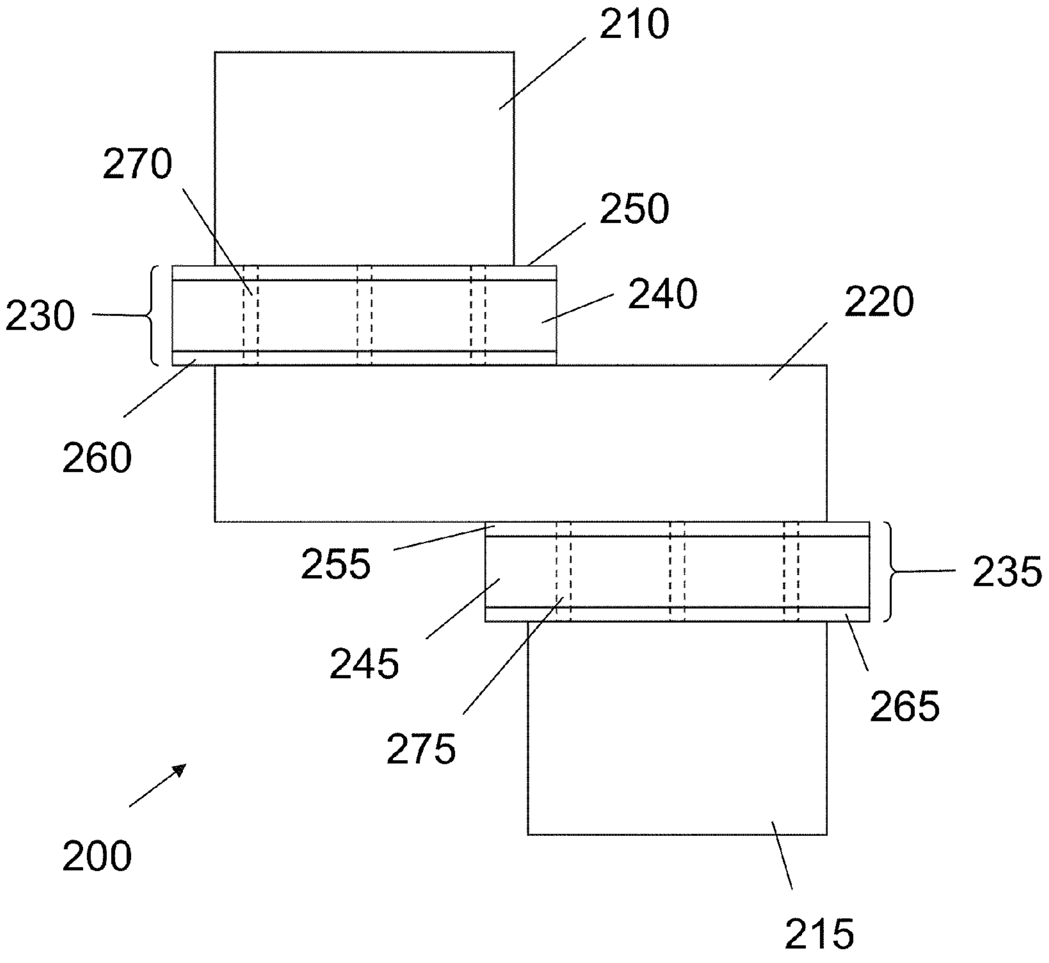
FIG. 2 shows a multiple stage ion transfer device according to an exemplary embodiment.

Referring to FIG. 2, a multi-stage ion transfer device 200 has a first tube or conduit 210 and a second tube or conduit 220 that are separated by a first ion selective aperture 230 that forms a common wall between the two tubes 210, 220. The ion selective aperture 230 comprises an insulating layer 240 having an electrically conductive layer or film 250 on a first surface and an electrically conductive layer or film 260 on a second surface. A second ion selective aperture 235 is located downstream of the first aperture 230 and forms a common wall segment between the second tube 220 and a third tube 215. The second ion selective aperture 235 includes an insulating layer 245 having an electrically conductive layer or film 255 on a first surface and an electrically conductive layer or film 265 on a second surface. Channels 270, 275 provide open communication through the ion selective aperture 230, 235. The second ion selective aperture 235 may be identical to the first, or it may be dimensionally different, and channels 270, 275 may have different cross-sectional area, so as to provide a different level of ion selectivity and transmission than does the first.

In operation, ions are first transferred from the ion source gas stream in tube 210 to an ion receiving gas stream in tube 220, and are then transferred a second time into a third gas stream flowing in tube 215. This multi-step procedure ensures that the final ion receiving stream flowing in tube 215 is essentially completely free of contamination from unwanted constituents present in the ion source stream so that optimum analytical results are obtained. A similar procedure can be used to perform chemical or physical modifications of the ions that are transferred from the first conduit to another conduit. Different chemical reactions or physical changes, such as those induced by radiation, structural change, or complex formation, among others, can be caused to occur at each stage, wherein the last stage is the transfer of the ions into an environment consistent with that needed for whatever the destination of the ions can be, for example, the sensor for optimum detection.

The embodiments illustrated in FIGS. 1 and 2 are limited to the transfer of one type of ion, either positive or negative. In certain circumstances, it can be desirable to simultaneously collect both positive and negative ions from an ion-carrying gas stream, move each type to a suitable environment, and thereafter detect or quantify both ion types. For example, with differential mobility spectrometry (DMS), ions of both polarities are simultaneously collected and detected, and 100% of the ions can be examined within the sensor 100% of the time. This can result in cost savings because two sensors, one for each type of ion, is not required. Furthermore, it can be superior to an alternative approach using one sensor, wherein a sample stream is pulsed, alternating between positive and negative ion introduction into the sensor, wherein 50% of the ions are examined within the sensor at a given time. That goal may be accomplished by employing two separate ion selective apertures: a first aperture collecting positive ions and a second aperture collecting negative ions. The environments into which the ions are moved can be different and can be adjusted for the specific conditions needed to optimize the resolution, detection, and identification of the transferred ions. For example, certain types of negative ions are best resolved in the presence of dopants, whereas the positive ions from the same source stream may be best resolved with no additives at all. Furthermore, a different sensor, or sensor type, may be needed to most efficiently detect positive ions as opposed to a sensor most appropriate for detecting negative ions, and those sensors may require different environments for ion detection. In such situations, positive ions would be transferred into an environment most suitable for detecting those ions, while negative ions would be moved into an environment containing dopants that quickly interact with the negative ions. Depending upon the specific ions being detected, the two ion streams may be led to separate sensors or to a single sensor capable of simultaneously detecting both positive and negative ions. For example, both positive and negative ions from certain chemical warfare agents and explosives can be detected. In another example, methylethyl salicylate (MES), an agent simulant, shows optimum response with DMS in positive ion mode being water depleted and in negative ion mode being water rich. With the ion transfer device, the response can be optimized for polarity of the analyte by sampling into appropriately conditioned separate analyzer gases using the dual polarity device.

Figure 3:
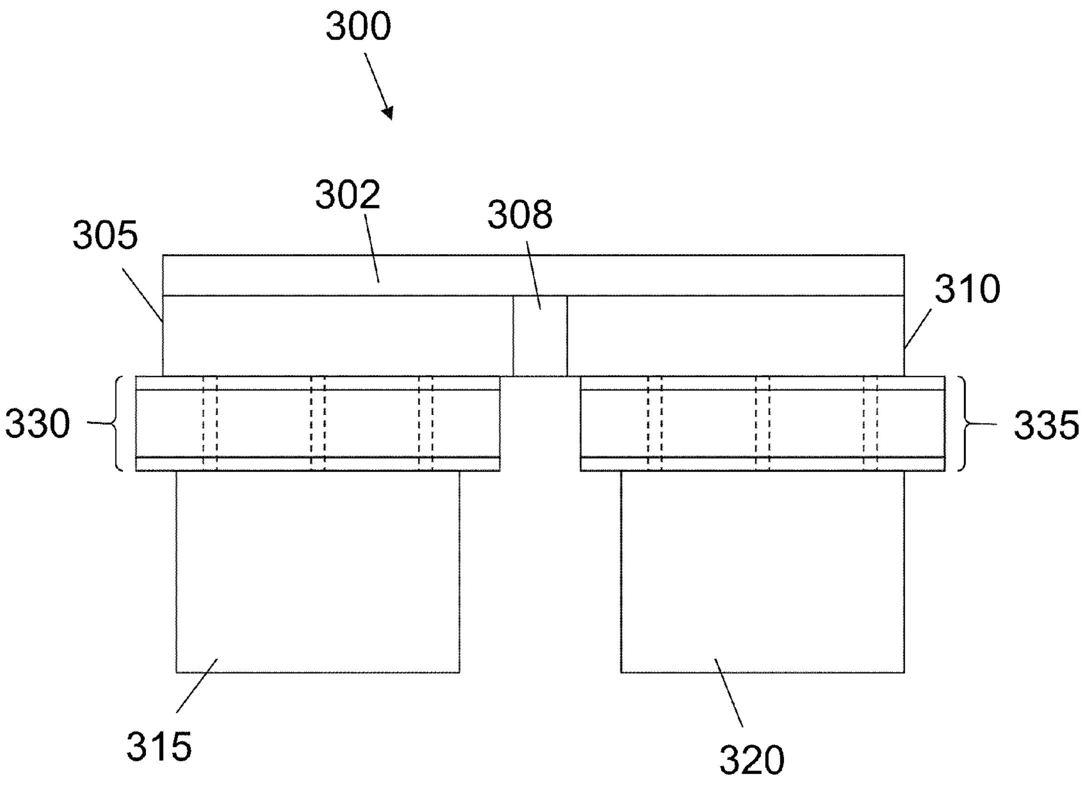
FIG. 3 shows an ion transfer device that can be arranged to separately remove both positive and negative ions from a gas stream according to an exemplary embodiment.

FIG. 3 shows an ion transfer device 300 having the capability for simultaneously producing two ion streams of different polarity from a single source stream. A source tube or other conduit 302 is divided into two segments 305, 310 by means of an insulator member 308, so that segment 305 is electrically separated from segment 310. A first ion selective aperture layer 330 forms a common wall between a portion of tube 305 and a second tube 315. A second ion selective aperture layer 335 forms a common wall between a portion of tube 310 and a third tube 320. By selecting the polarity of the electrical charge applied to the first aperture layer 330 to be different from that applied to the second aperture layer 335, ions of correspondingly different polarity pass through the first aperture layer 330 as pass through the second aperture layer 335. Both aperture layers 330, 335 may be identical and may be configured as described above with respect to FIG. 1. The gas streams in second tube 315 and third tube 320 can be different and can contain chemicals that can stabilize or modify ion structure and/or physical behavior. The streams containing the different polarity ions may then be directed to different sensors or combined and sent to a single sensor capable of detecting positive and negative ions simultaneously.

Figure 4:
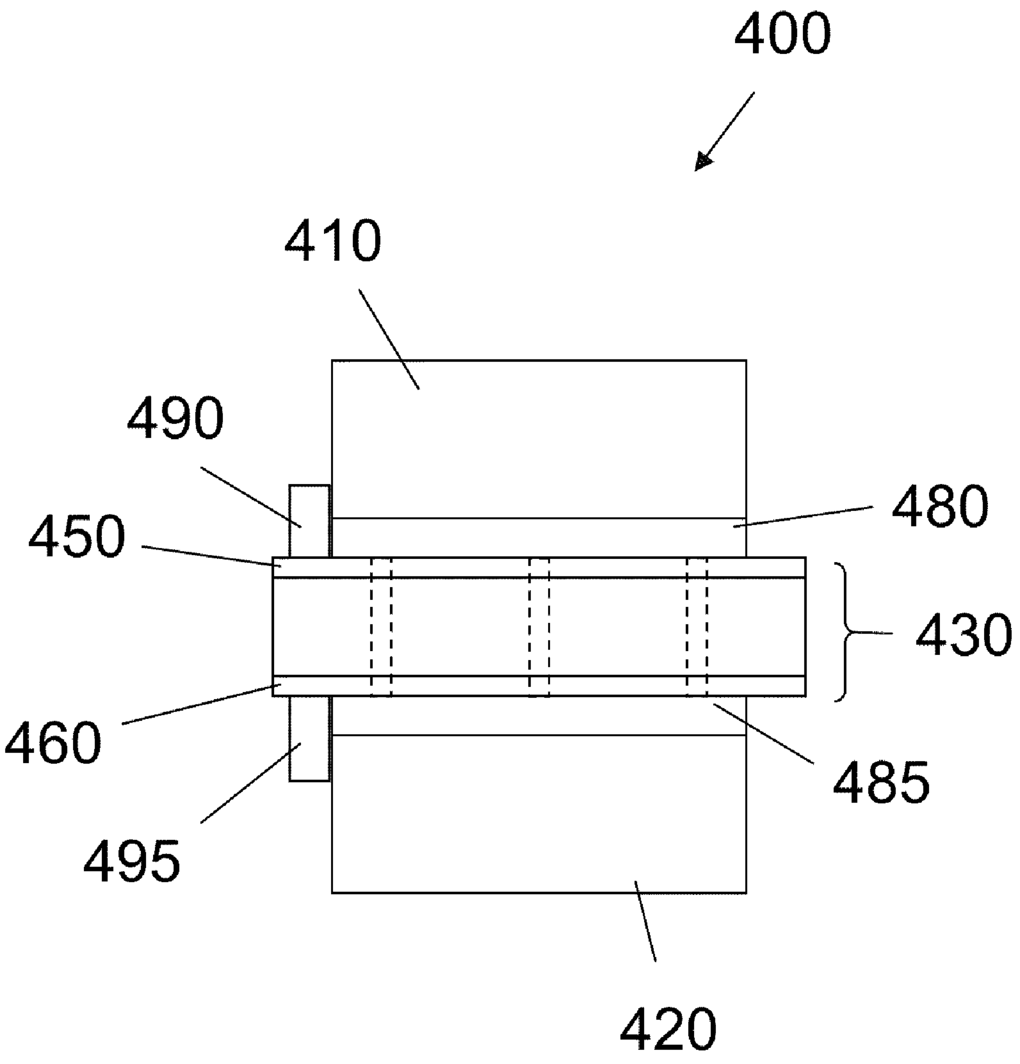
FIG. 4 shows an ion transfer device according to an exemplary embodiment.

Referring to FIG. 4, an ion transfer device 400 has first and second gasket members 480, 485 to obtain a gas-tight seal between a first tube 410 and a conductive layer 450 of an ion selective aperture layer 430, and between a second tube 420 and a conductive layer 460 of the ion selective layer 430. Because gasket members 480, 485 also electrically isolate the first and second tubes 410, 420 from the ion selective aperture layer 430, it can be useful to provide conductive jumper wires 490, 495 to electrically connect the tubes 410, 420 to the aperture 430.

Figure 5:
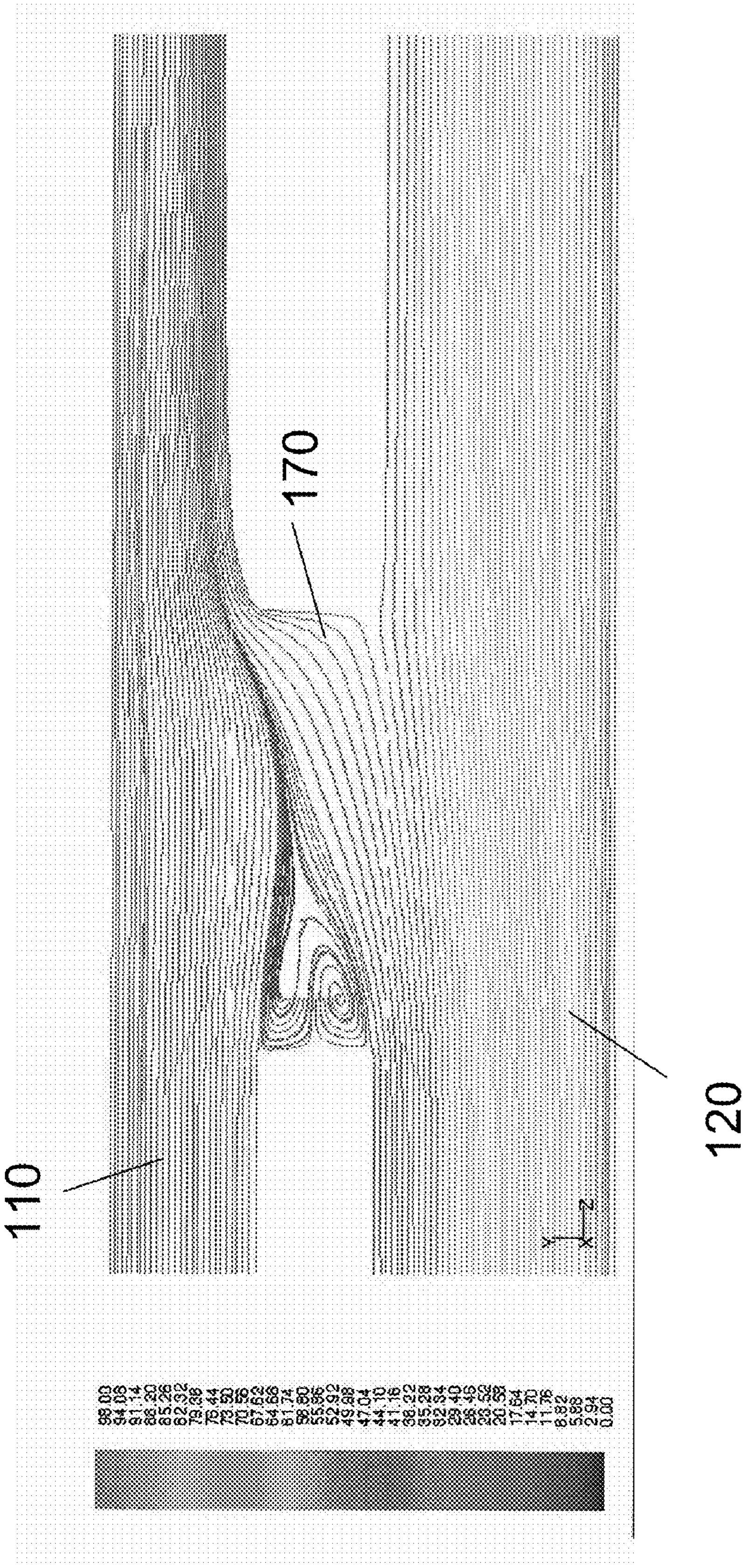
FIG. 5 shows a depiction of the gas flow paths formed in an ion transfer device according to an exemplary embodiment.

In these exemplary embodiments, mixing of the gas streams in the different tubes can be minimized if the streams are all in laminar flow. In theory, there should be very little transfer of neutral molecules and an application of an electric field should either push or pull the ions through the ion selective apertures without carrying along neutral molecules, because the ions are under both electric field and aerodynamic forces, and the neutral molecules are under aerodynamic forces. However, depending to some degree upon the geometry of the aperture between the two tubes, a slowly turning boundary can form between the gas streams in the tubes, as shown in FIG. 5. FIG. 5 shows a fluid dynamic picture of parallel flowing gases within tubes 110, 120 of FIG. 1 flow through channel 170. A leakage of gas from the gas flowing in the tubes 110, 120 from which the ions originate is acceptable (on the right side of channel 170). However, diffusion of molecules across the slowly turning boundary can lead to cross-pollution of each gas stream by the other and must be avoided by modifying the width/length ratio of channel 170, or changing the shape of the top and/or bottom of channel 170.

Figure 6A:
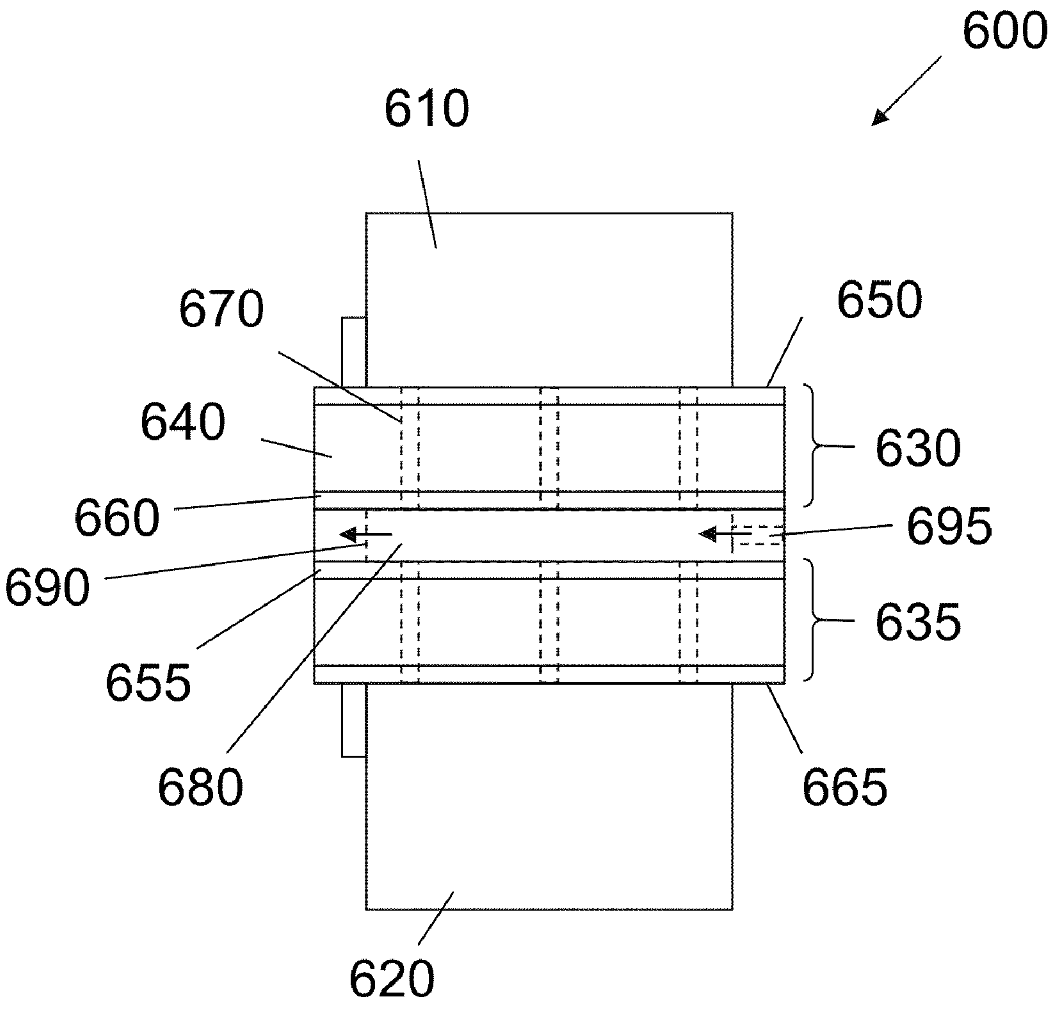
FIG. 6A shows an ion transfer device that can minimize cross-pollution of one gas stream with the other gas stream according to an exemplary embodiment.

Alternatively, the gas diffusion and cross-pollution illustrated in FIG. 5 can be reduced or even eliminated by employing two ion selective apertures arranged in series and separated by an enclosed space, as is shown by the ion transfer device 600 in FIG. 6A. A first tube or conduit 610 carries a flowing ion-containing gas stream, and a second tube or conduit 620 carries a flowing ion-receiving gas stream. A first ion selective aperture layer 630 includes a non-conductive insulating layer 640 having an electrically conductive surface 650, an electrically conductive surface 660, and one or more channels 670 extending through the insulating layer 640 and the electrically conductive surfaces 650, 660. The first ion selective aperture 630 forms a common wall segment separating the interior of tube 610 from the interior of an enclosed space 680. Likewise, a second ion selective aperture layer 635 having a conductive surface layer 655 and a conductive surface layer 665, and which may be identical to the first ion selective aperture layer 630, forms a common wall segment that separates the interior of tube 620 from the enclosed space 680. This dual ion selective aperture design can allow greater freedom in selection of aperture channel size, shape, and placement, as well as in flow adjustment in both the ion source tube and the ion receiving tube, as compared to a single ion selective aperture design. This embodiment also allows more precise control of the electric field across the layers, which allows the device to operate with enclosed space 680 at a higher pressure than either the first tube 610 or second tube 620, virtually eliminating mixing between the tubes.

Figure 6B:
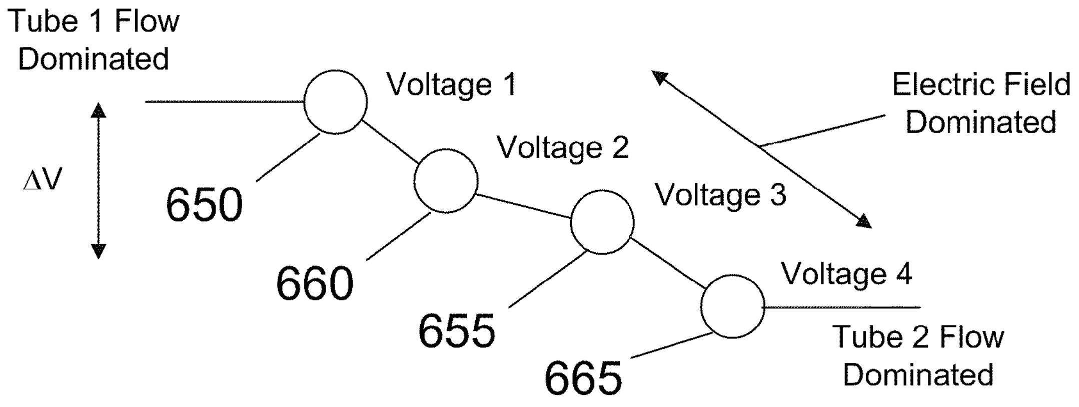
FIG. 6B shows a diagram of the voltage profile across the ion transfer device of FIG. 6A according to an exemplary embodiment.

A gas stream containing the desired ion species in admixture with unwanted contaminant molecules is caused to flow through first tube 610, and an ion-receiving gas stream of selected composition is caused to flow through the second tube 620. Referring to FIG. 6B, an electrical voltage can be applied to each of the conductive layers 650, 655, 660, 665 of the ion selective aperture layers 630, 635 in a manner whereby voltages are changed stepwise to approach ground. In this arrangement, the ions in the gas stream flowing in tube 610 are pushed or pulled through the first aperture 630 and into enclosed space 680 by the applied electrical fields. Ions entering enclosed space 680 are then pushed or pulled through the second aperture 635 and into the gas within tube 620 by the electrical fields created by application of a voltage to the conductive surfaces 655, 665 of the second aperture 635. That arrangement serves to decouple the effects of changes in the gas flow or composition in the first tube 610 upon the transfer of neutral molecules to the gas flowing in receiving tube 620. For example, if the ion-carrying gas in tube 610 comprises ambient air containing 11,000 to 15,000 ppm of water, then the ion transfer device 600 can allow more than 50% of the ions to be transferred from tube 610 to tube 620 along with only about 80 ppm (0.06%) water.

Cross-contamination of the ion-receiving gas flowing in tube 620 by the ion source gas in tube 610 may be even further reduced by introducing a low-rate flow from gas source 695 into one end of enclosed space 680 and exhausting an equal volume of gas 690 at the opposite end of the enclosed space 680. The composition of the gas source 695 is preferably the same as that of the ion-receiving gas in tube 620. Further, the pressure within enclosed space 680 may be maintained slightly higher than that of the ion source gas so as to cause a minor amount of spillover from the gas in space 680 into the ion source gas stream in tube 610.

Different parameters, such as structural characteristics of the ion selective aperture, velocity and direction of gas flow, and placement of electrodes, can control the movement of ions and neutral molecules from one gas stream to another gas stream. Structural characteristics of the particular ion selective aperture employed include aperture channel size, shape, and pattern, as well as the composition and thickness of the insulating layer. Ion transfer between gas streams is also affected by the velocity of gas flow across the ion selective aperture in both the ion source stream and the ion receiving stream, as well as by the direction of flow in the source and receiving streams, either concurrent or counter-current. Placement of the electrodes used to urge ions from the source stream to the receiving stream as well as the strength of the electric fields created by the application of differing voltages to the electrodes can also affect ion movement.

The ion transfer device described herein finds particular application in the field of chemical detection, analysis, and identification of explosives and explosives residues, of drugs, of toxic industrial chemicals of all sorts, of certain biological agents, and for any other application that requires extreme detector sensitivity and identification capability. In particular, the disclosed device facilitates the detection of ions that are best collected in one environment and detected or analyzed in a different environment. The systems and methods allow for the automated collection of ions, thereby providing an increase in the sensitivity of sensors that measure concentration. Chemicals or labels can be added to the ion stream to produce ion adducts or aggregates, or tagged ions of other sorts, or to cause reactions that change ion properties to occur. Also, standards (e.g., known quantities of a specific chemical) can be applied to the ion-receiving stream for consistent use with a sensor.

In another embodiment, an ion transfer device allows for the combination or reaction of the collected ions with chemicals that produce neutral or uncharged molecules that can subsequently be detected using sensors of other types as, for example, optical spectroscopic devices and acoustic wave devices, among many others. That capability allows neutral compounds present in air, or in liquids, or on surfaces, to be converted to ions in the manner described in U.S. Pat. No. 7,138,626, which is incorporated by reference in its entirety. Ions so produced may be collected using aerodynamic or electric field means and then transferred to an environment where they can be modified or tagged to produce molecules that are altered to enhance detection in a manner that has been previously described.

One advantage of such a methodology is the immediacy of the detection and/or identification of a neutral compound or sample that can be obtained directly from the environment. The methods and systems can also be used in conjunction with existing detectors that identify and quantify neutral chemicals or other compounds. As a result, existing detectors, which presently can detect chemicals present in only vapors or gases, can detect chemicals having extremely low vapor pressures (e.g., explosives and drugs), dissolved in liquids, or present on the surfaces of a wide variety of matrices (e.g., skin, paper, textiles, building materials). For example, neutral compounds present in air, dissolved in liquids, or on solid surfaces, can be ionized in the manner described in U.S. Pat. No. 7,138,626. Those ions may then be collected using aerodynamic or electric field means, transferred to an environment where they are converted to a neutral state using the methods and systems described herein, and thereafter aerodynamically pulled into a sensor or detector that is capable of identifying specific neutral chemicals or classes of chemicals. Such sensors or detectors include, for example, those employing optical spectroscopy and spectrometry, mobility spectrometry, and variants thereof.

A sensor used with the ion transfer systems and methods can also serve to provide real-time feedback control of the environment into which the ions are transferred by automatically monitoring the level of selected background chemicals present in that environment as a function of time. The monitoring may then be used to trigger an immediate response whenever the level of the selected background chemical (e.g., water vapor) falls above or below preset limits by causing adjustment of the devices feeding chemicals or other additives into the environment.

Figure 7:
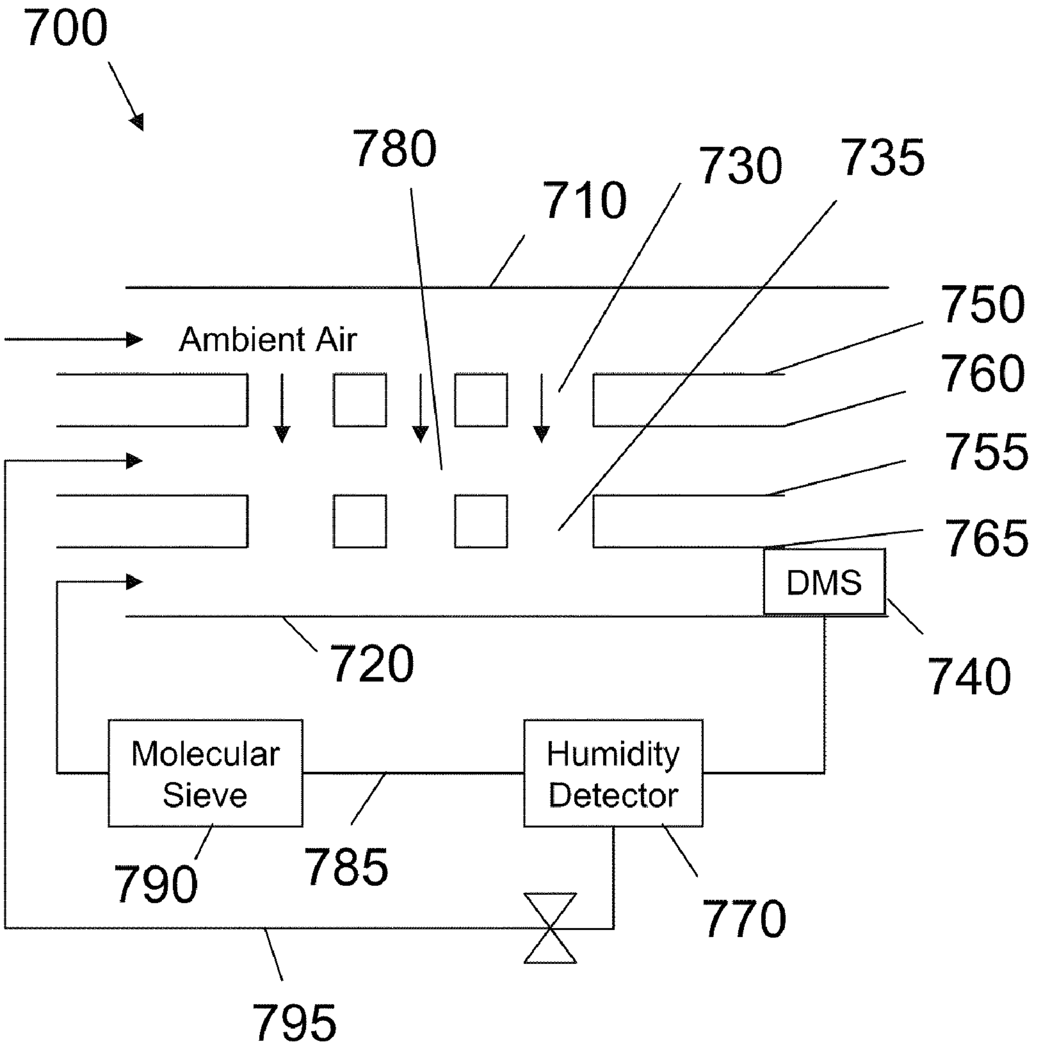
FIG. 7 shows a feedback arrangement for control of the environment to which ions are transferred by the ion transfer device according to an exemplary embodiment.

FIG. 7 shows a feedback control arrangement 700 that is based on the measurement of the amount of water vapor in a gas stream introduced into a sensor. For example, in the positive ion mode of a DMS, the $H_3O^+$ ion from water can be continuously measured in realtime. Ions are collected from an ion source stream, such as ambient air, which flows through ion sampling tube 710 through a pair of ion selective aperture layers 730, 735 that are arranged as shown in FIG. 6A. Ions present in tube 710 are urged through a first ion selective aperture layer 730 under the influence of a voltage gradient across conductive layers 750, 760 into a gas-filled enclosed space 780. The gas that fills space 780 is free of interfering contaminants and serves to reduce cross-contamination of the sample stream, as was previously discussed in relation to the embodiment of FIG. 6A. Ions entering space 780 are then urged through a second ion selective aperture layer 735 under the influence of a voltage differential across conductive layers 755, 765 into a selective gas flowing through an "ion receiving" tube 720 which discharges into a sensor 740.

In one embodiment, sensor 740 is a differential mobility spectrometer, such as the Sionex microDMx, which provides extremely rapid detection and identification of ions. The ion-carrying gas introduced into sensor 740 can be of fixed composition, such as air containing a very low and stable amount of water. The humidity of the gas discharging from sensor 740 may be continuously monitored by detector means 770 and, based upon its humidity level, split into two streams 785, 795. Stream 785 may be then passed through a desiccant bed, such as a molecular sieve 790, and returned to the ion receiving stream flowing in tube 720. Stream 795 may be passed to enclosed space 780 so as to keep the pressure in space 780 slightly greater than that in tube 710. Further, moisture can be added to stream 795 and past the molecular sieve 790 to achieve the desired final humidity. The composition and humidity of the ion receiving gas stream is thereby maintained resulting in optimum sensor performance.

Figure 8:
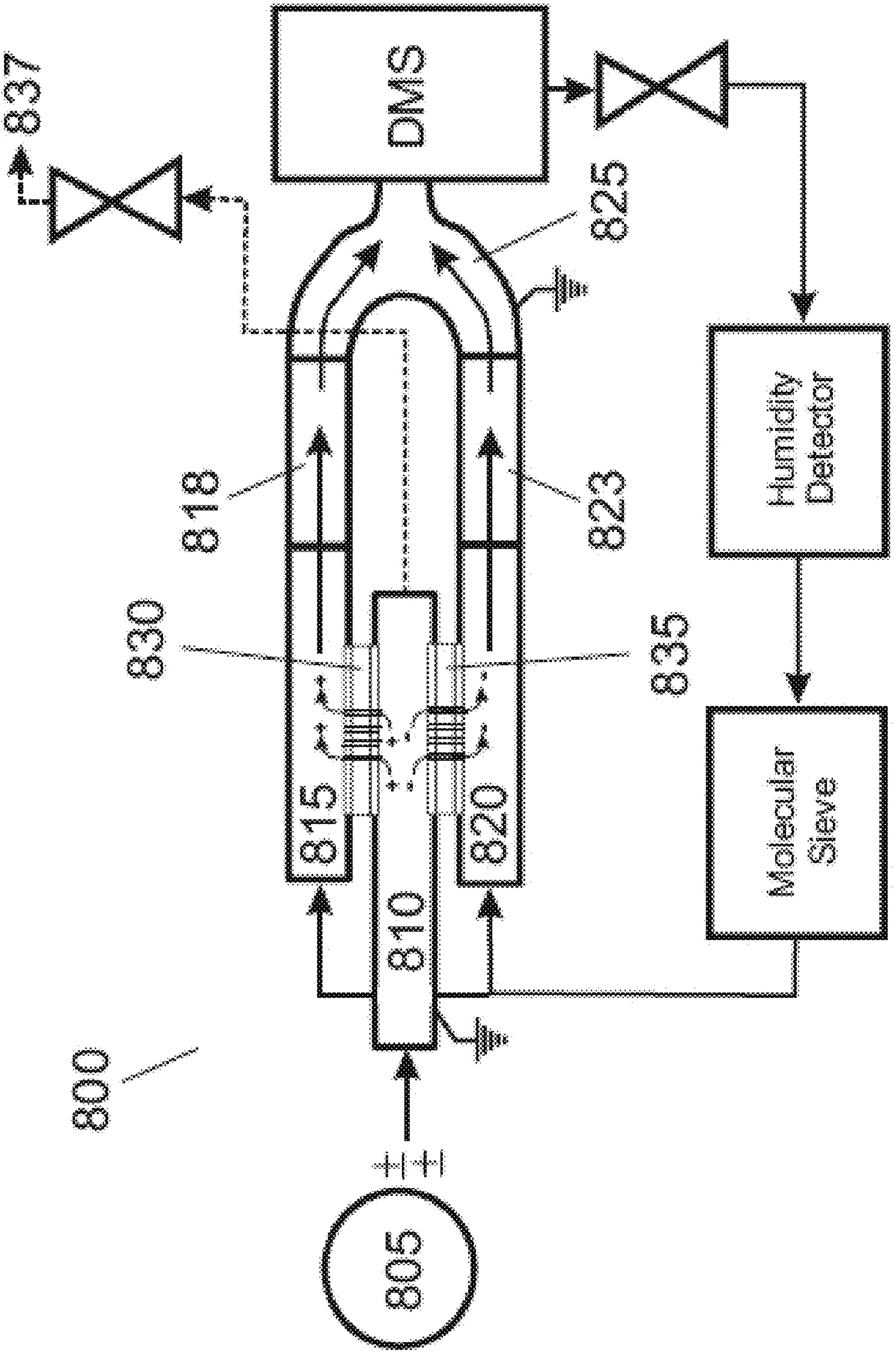
FIG. 8 shows an ion transfer device for collection of both positive and negative ion polarities from a dual polarity ion source using positive and negative optical wells according to an exemplary embodiment.

Referring to FIG. 8, a dual polarity ion transfer device 800 has a first tube or conduit 810 and a second tube or conduit 815 that are separated by a first ion selective aperture 830 that forms a common wall between the two tubes 810, 815. A second ion selective aperture layer 835 is located opposite the first aperture layer 830 and forms a common wall segment between the first tube 810 and a third tube 820.

In operation, both polarity ions are first collected from the dual polarity ion source into tube 810 and transmitted down the tube to the ion transfer region. In this embodiment, an attractive potential for each polarity ion is formed orthogonally to the flow of gas in tube 810 in the transfer device region due to voltages applied to outer conductive layers of aperture layers 830 and 835. Positive ions are attracted through aperture layer 830 into tube 815 held at a high negative potential. Negative ions are attracted through aperture layer 835 into tube 820. Flow of conditioned gas through tubes 815 and 820 entrain the transmitted ions that are transferred across aperture layers 830 and 835, respectively. Residual neutral materials pumped from the source region are exhausted to waste 837. The ions transmitted through tubes 815, entrained in conditioned gas, are carried through dielectric member 818 to ground potential and mixed at mixing union 825 and further transmitted to the DMS for detection and analysis. The ions transmitted through tubes 820, entrained in conditioned gas, are carried through dielectric member 823 to ground potential and mixed at mixing union 825 and further transmitted to the DMS for detection and analysis. The gases exiting the DMS are purified, conditioned, and recirculated.

Figure 9:
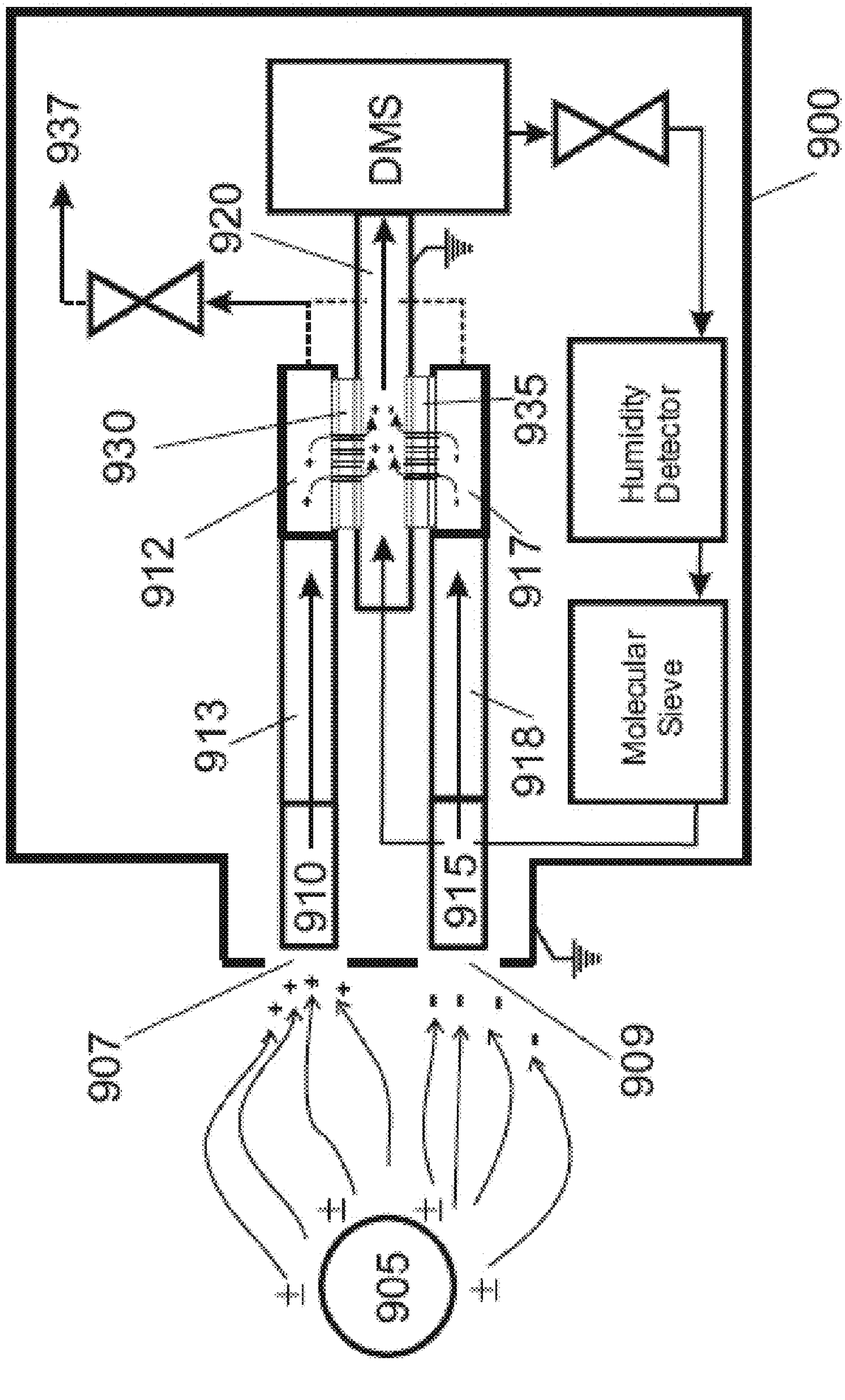
FIG. 9 shows an ion transfer device for collection of both positive and negative ion polarities from a dual polarity ion source using fluid dynamical collection of source gases according to an exemplary embodiment.

Referring to FIG. 9, a dual polarity ion transfer device 900 has first tube 910 and a second tube or conduit 915 that are collecting positive and negative ions from the bottom of optical wells that sample ions from dual polarity source 905. Optical lens opening are positioned in front of the tubes to allow electrostatic focusing of positive ions through lens 907 and negative ions through lens opening 909. In this embodiment, the lenses are held at ground potential and positive ions from source 905 are attracted to the entrance of tube 910 by a large negative potential applied to the entrance region of 910. The negative ions from source 905 are attracted to the entrance of tube 915 by a large positive potential applied to the entrance region of tube 915. Flow carried the ion containing sample stream through dielectric first dielectric tube 913 to sample tube region 912 held at a positive potential relative to ground. Positive ions are selected from neutral flow components in said tube 912 by attractive fields from a first ion selective aperture layer 930 that forms a common wall between the two tubes 912 (floating at a positive potential) and 920 (held at ground). Flow carried the ion containing sample stream through dielectric second dielectric tube 918 to sample tube region 917 held at a negative potential relative to ground. Negative ions are selected from neutral flow components in said tube 917 by attractive fields from a first ion selective aperture layer 935 that forms a common wall between the two tubes 917 (floating at a negative potential) and 920 (held at ground).

In operation, both polarity ions are first collected from the dual polarity ion source into separate ion optical wells through opening 907 for positive ions and 909 for negative ions. The voltage applied to the front of the sampling tubes will determine the polarity of ions collected at bottom of the optical wells. Attraction of positive ions to sample tube 910 is accomplished by applying a negative voltage to the front of the tube. Attraction of negative ions to sample tube 915 is accomplished by applying a positive voltage to the front of the tube. Once collected at the front of the respective tubes, the ions are entrained in the flow through the tubes. In the case of positive ions in first sample tube 910, the ions are pushed up a potential barrier by flow through first dielectric tube 913 into first sample tube 912. In the case of negative ions in second sample tube 915, the ions are pushed up a potential barrier by flow through first dielectric tube 918 into first sample tube 917. Positive ions passing through sample tube 912 (held at high positive potential) are attracted through aperture layer 930 into tube 920 held at a ground potential. Negative ions passing through sample tube 917 (held at high negative potential) are attracted through aperture layer 935 into tube 920 held at a ground potential. Residual neutral materials pumped from the source region are exhausted to waste 937. The ions transmitted through tube 920, entrained in conditioned gas, are carried to the DMS for detection and analysis. The gases exiting the DMS are purified, conditioned, and recirculated.

The embodiments described above are intended to be exemplary. One skilled in the art recognizes that numerous alternative components and embodiments may be substituted for the particular examples described herein and still fall within the scope of the invention.

What is claimed is:

1. An ion transfer device comprising:

a first conduit comprising a first gas stream;

a second conduit comprising a second gas stream to receive the ions from the first gas stream; and an aperture layer disposed between the first conduit and the second conduit, the aperture layer comprising:

a first conductive layer proximate to the first conduit;

a second conductive layer proximate to the second conduit; and an insulating layer between the first and second conductive layers comprising one or more channels extending from the first conduit to the second conduit and through the first and second conductive layers;

wherein ions are transferred from said first conduit to said second conduit through said channels.

2. The ion transfer device according to claim 1, further comprising a first voltage applied to the first conductive layer and a second voltage applied to the second conductive layer.

3. The ion transfer device according to claim 2, wherein the first voltage is greater than the second voltage.

4. The ion transfer device according to claim 2, wherein the second voltage is greater than the first voltage.

5. The ion transfer device according to claim 2, wherein the first voltage and the second voltage have the same polarity as an ion to be transferred from the first conduit to the second conduit.

6. The ion transfer device according to claim 1, wherein the first conduit is concentrically located with the second conduit, and wherein at least a portion of the first conduit and at least a portion of the aperture layer are located within the second conduit.

7. The ion transfer device according to claim 1, further comprising:

a first gasket member disposed between the first conduit and the first conductive layer; and a second gasket member disposed between the second conduit and the second conductive layer;

wherein the first and second gasket members electrically isolate the first and second conduits from the aperture layer.

8. The ion transfer device according to claim 7, wherein the first conduit is electrically coupled to the insulating layer, and wherein the second conduit is electrically coupled to the insulating layer.

9. An ion transfer device comprising:

a first conduit comprising a first gas stream;

a second conduit comprising a second gas stream to receive the ions from the first gas stream;

a first aperture layer disposed between the first conduit and the second conduit, the first aperture layer comprising:

a first conductive layer proximate to the first conduit;

a second conductive layer proximate to the second conduit; and an insulating layer between the first and second conductive layers comprising one or more channels extending from the first conduit to the second conduit and through the first and second conductive layers;

a third conduit comprising a third gas stream to receive the ions from the second gas stream; and a second aperture layer disposed between the second conduit and the third conduit, the second aperture layer comprising:

a third conductive layer proximate to the second conduit;

a fourth conductive layer proximate the third conduit; and a second insulating layer between the third and fourth conductive layers comprising one or more channels extending from the second conduit to the third conduit and through the third and fourth conductive layers;

wherein ions are transferred from said first conduit to said second conduit through said channels in said first aperture layer, and transferred from said second conduit to said third conduit through said channels in said second aperture layer.

10. The ion transfer device according to claim 9, wherein the first aperture layer collects ions having a first polarity and the second aperture layer collects ions having a second polarity.

11. The ion transfer device according to claim 10, wherein the first polarity is positive.

12. The ion transfer device according to claim 9, further comprising an inlet for gas to enter the second conduit.

13. The ion transfer device according to claim 12, further comprising an outlet for gas to exit the second conduit.

14. The ion transfer device according to claim 10, wherein the second conduit has a higher pressure than the first conduit.

15. The ion transfer device according to claim 10, further comprising a sensor in the third gas stream.

16. The ion transfer device according to claim 15, wherein the sensor is a differential mobility spectrometer.

17. The ion transfer device according to claim 9, further comprising:

a first gasket member disposed between the first conduit and the first conductive layer; and a second gasket member disposed between the second conduit and the second conductive layer;

wherein the first and second gasket members electrically isolate the first and second conduits from the aperture layer.

18. The ion transfer device according to claim 17, wherein the first conduit is electrically coupled to the insulating layer, and wherein the second conduit is electrically coupled to the insulating layer.

19. An ion transfer device comprising:

a first conduit comprising a first gas stream, the first conduit divided into first and second segments separated by an insulator;

a second conduit comprising a second gas stream to receive the ions from the first segment;

a third conduit comprising a third gas stream to receive ions from the second segment;

a first aperture layer disposed between the first segment and the second conduit, the first aperture layer comprising:

a first conductive layer proximate to the first segment;

a second conductive layer proximate to the second conduit; and a first insulating layer between the first and second conductive layers comprising one or more channels extending from the first segment to the second conduit and through the first and second conductive layers; and a second aperture layer disposed between the second segment and the third conduit, the second aperture layer comprising:

a third conductive layer proximate to the second segment;

a fourth conductive layer proximate to the third conduit; and a second insulating layer between the third and fourth conductive layers comprising one or more channels extending from the second segment to the third conduit and through the third and fourth conductive layers;

wherein ions are transferred from said first segment to said second conduit through said channels in said first aperture layer and transferring ions from said second segment to said third conduit through said second aperture layer.

20. The ion transfer device according to claim 19, wherein the second conduit has a first polarity and the third conduit has a second polarity.

21. The ion transfer device according to claim 19, wherein the first aperture layer has a first polarity and the second aperture layer has a second polarity.

22. The ion transfer device according to claim 19, further comprising a first voltage applied to the first conductive layer and a second voltage applied to the second conductive layer.

23. The ion transfer device according to claim 22, wherein the first voltage is greater than the second voltage.

24. The ion transfer device according to claim 22, wherein the second voltage is greater than the first voltage.

25. The ion transfer device according to claim 22, wherein the first voltage and the second voltage have the same polarity as an ion to be transferred from the first conduit to the second conduit.

26. The ion transfer device according to claim 19, further comprising:

a first gasket member disposed between the first conduit and the first conductive layer; and a second gasket member disposed between the second conduit and the second conductive layer;

wherein the first and second gasket members electrically isolate the first and second conduits from the aperture layer.

27. The ion transfer device according to claim 26, wherein the first conduit is electrically coupled to the insulating layer, and wherein the second conduit is electrically coupled to the insulating layer.

28. A method for transferring ions comprising:

directing a plurality of ions from a first conduit to a second conduit through an aperture layer comprising a first conductive layer proximate to the first conduit, a second conductive layer proximate to the second conduit, and an insulating layer between the first and second conductive layers comprising one or more channels extending from the first conduit to the second conduit and through the first and second conductive layers;

applying a voltage to the first conductive layer; and applying a second voltage to the second conductive layer;

wherein the first voltage is different than the second voltage.

29. The method according to claim 28, wherein the first voltage is greater than the second voltage.

30. The method according to claim 28, further comprising adjusting a gas flow rate in the first conduit or the second conduit.

31. A method for transferring ions comprising:

directing one or more ions from a first conduit to a second conduit through a first aperture layer comprising a first conductive layer proximate to the first conduit, a second conductive layer proximate to the second conduit, and an insulating layer between the first and second conductive layers comprising one or more channels extending from the first conduit to the second conduit and through the first and second conductive layers;

applying a voltage to the first conductive layer;

applying a second voltage to the second conductive;

wherein the first voltage is different than the second voltage;

directing the plurality of ions from the second conduit to a third conduit through a second aperture layer comprising a third conductive layer proximate to the second conduit, a fourth conductive layer proximate to the third conduit, and an insulating layer between the third and fourth conductive layers comprising one or more channels extending from the second conduit to the third conduit and through the third and fourth conductive layers;

applying a third voltage to the third conductive layer; and applying a fourth voltage to the fourth conductive layer;

wherein the third voltage is different than the fourth voltage.

32. The method according to claim 31, wherein the first voltage is greater than the second voltage.

33. The method according to claim 31, wherein the third voltage is greater than the fourth voltage.

34. The method according to claim 31, further comprising adjusting a gas flow rate in the first conduit, the second conduit, or the third conduit.

35. The method according to claim 31, further comprising adjusting a pressure in the second conduit.

36. The method according to claim 35, wherein the pressure in the second conduit is higher than a pressure in the first conduit.

37. A method for transferring ions comprising:

insulating a first segment of a first conduit from a second segment of the first conduit;

directing a first plurality of ions from the first segment to a second conduit through a first aperture layer comprising a first conductive layer proximate to the first segment, a second conductive layer proximate to the second conduit, and an insulating layer between the first and second conductive layers comprising one or more channels extending from the first segment to the second conduit and through the first and second conductive layers;

applying a voltage to the first conductive layer;

applying a second voltage to the second conductive layer;

wherein the first voltage is different than the second voltage;

directing a second plurality of ions from the second segment to a third conduit through a second aperture layer comprising a third conductive layer proximate to the second segment, a fourth conductive layer proximate to the third conduit, and an insulating layer between the third and fourth conductive layers comprising one or more channels extending from the second segment to the third conduit and through the third and fourth conductive layers;

applying a third voltage to the third conductive layer; and applying a fourth voltage to the fourth conductive layer;

wherein the third voltage is different than the fourth voltage.

38. The method according to claim 37, wherein the first voltage is greater than the second voltage.

39. The method according to claim 37, wherein the third voltage is greater than the fourth voltage.

40. The method according to claim 37, further comprising adjusting a gas flow rate in the first segment, the second segment, the second conduit, or the third conduit.

* * * * *